(12) United States Patent
Luo et al.

(10) Patent No.: US 10,570,219 B2
(45) Date of Patent: Feb. 25, 2020

(54) PRODUCTION OF HETEROPHASIC POLYMERS IN GAS OR SLURRY PHASE

(71) Applicant: ExxonMobil Chemical Patents Inc., Baytown, TX (US)

(72) Inventors: Lubin Luo, Houston, TX (US); Jeanette M. Diop, Houston, TX (US); Jian Yang, Houston, TX (US); Sudhin Datta, Houston, TX (US); Patrick Brant, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/570,822

(22) PCT Filed: May 27, 2016

(86) PCT No.: PCT/US2016/034768
§ 371 (c)(1),
(2) Date: Oct. 31, 2017

(87) PCT Pub. No.: WO2016/196339
PCT Pub. Date: Dec. 8, 2016

(65) Prior Publication Data
US 2018/0258195 A1 Sep. 13, 2018

Related U.S. Application Data

(60) Provisional application No. 62/206,004, filed on Aug. 17, 2015, provisional application No. 62/205,977, (Continued)

(51) Int. Cl.
*C08F 210/06* (2006.01)
*C08F 4/6592* (2006.01)
(Continued)

(52) U.S. Cl.
CPC .............. *C08F 2/34* (2013.01); *C08F 2/01* (2013.01); *C08F 2/12* (2013.01); *C08F 4/65916* (2013.01);
(Continued)

(58) Field of Classification Search
CPC ...... C08F 210/06; C08F 210/02; C08F 2/001; C08F 4/6592
See application file for complete search history.

(56) References Cited

U.S. PATENT DOCUMENTS

| 5,049,535 A | 9/1991 | Resconi et al. |
| 5,276,208 A | 1/1994 | Winter et al. |

(Continued)

FOREIGN PATENT DOCUMENTS

| CN | 102731691 | 2/2014 |
| EP | 0576970 | 1/1994 |

(Continued)

OTHER PUBLICATIONS

U.S. Appl. No. 16/301,596, filed Nov. 14, 2018.
(Continued)

*Primary Examiner* — Caixia Lu
(74) *Attorney, Agent, or Firm* — Catherine L. Bell

(57) ABSTRACT

Methods for the production of heterophasic polymers in gas and slurry phase polymerization processes, and polymer compositions made therefrom, are disclosed herein.

35 Claims, 11 Drawing Sheets

Related U.S. Application Data filed on Aug. 17, 2015, provisional application No. 62/171,616, filed on Jun. 5, 2015, provisional application No. 62/171,590, filed on Jun. 5, 2015.

(51) Int. Cl.

| | | |
|---|---|---|
| *C08L 23/16* | (2006.01) | |
| *C08F 2/34* | (2006.01) | |
| *C08L 23/14* | (2006.01) | |
| *C08F 110/06* | (2006.01) | |
| *C08F 210/16* | (2006.01) | |
| *C08L 23/12* | (2006.01) | |
| *C08L 23/06* | (2006.01) | |
| *C08F 2/01* | (2006.01) | |
| *C08F 2/12* | (2006.01) | |
| *C08F 4/659* | (2006.01) | |
| *C08F 110/02* | (2006.01) | |
| *C08F 210/02* | (2006.01) | |

(52) U.S. Cl.
CPC ........ *C08F 4/65927* (2013.01); *C08F 110/02* (2013.01); *C08F 110/06* (2013.01); *C08F 210/02* (2013.01); *C08F 210/06* (2013.01); *C08F 210/16* (2013.01); *C08L 23/06* (2013.01); *C08L 23/12* (2013.01); *C08L 23/14* (2013.01); *C08L 23/16* (2013.01); *C08F 2500/05* (2013.01); *C08F 2500/16* (2013.01); *C08L 2205/02* (2013.01); *C08L 2207/02* (2013.01); *C08L 2314/06* (2013.01)

(56) References Cited

U.S. PATENT DOCUMENTS

| | | |
|---|---|---|
| 5,278,264 A | 1/1994 | Spaleck et al. |
| 5,411,994 A | 5/1995 | Galli et al. |
| 5,459,117 A | 10/1995 | Ewen |
| 5,532,396 A | 7/1996 | Winter et al. |
| 5,539,076 A | 7/1996 | Nowlin et al. |
| 5,543,373 A | 8/1996 | Winter et al. |
| 5,547,756 A | 8/1996 | Kamo et al. |
| 5,585,509 A | 12/1996 | Langhauser et al. |
| 5,589,549 A | 12/1996 | Govoni et al. |
| 5,631,202 A | 5/1997 | Ewen |
| 5,661,098 A | 8/1997 | Harrison et al. |
| 5,696,045 A | 12/1997 | Winter et al. |
| 5,700,886 A | 12/1997 | Winter et al. |
| 5,770,753 A | 6/1998 | Kueber et al. |
| 5,786,432 A | 7/1998 | Kueber et al. |
| 5,840,644 A | 11/1998 | Kuber et al. |
| 5,990,242 A | 11/1999 | Naga et al. |
| 5,869,584 A | 12/1999 | Winter et al. |
| 6,001,764 A | 12/1999 | Pullukat et al. |
| 6,028,140 A | 2/2000 | Collina et al. |
| 6,051,727 A | 4/2000 | Kueber et al. |
| 6,069,213 A | 5/2000 | Nemzek et al. |
| 6,121,182 A | 9/2000 | Okumura et al. |
| 6,150,481 A | 11/2000 | Winter et al. |
| 6,174,930 B1 | 1/2001 | Agarwal et al. |
| 6,242,544 B1 | 6/2001 | Kueber et al. |
| 6,255,506 B1 | 7/2001 | Kueber et al. |
| 6,262,195 B1 | 7/2001 | Dall'Occo et al. |
| 6,329,315 B1 | 12/2001 | Denton et al. |
| 6,350,830 B1 | 2/2002 | Gores et al. |
| 6,376,627 B1 | 4/2002 | Burkhardt |
| 6,399,533 B2 | 6/2002 | Sacchetti et al. |
| 6,429,250 B1 | 8/2002 | Rohrmann et al. |
| 6,444,833 B1 | 9/2002 | Ewen et al. |
| 6,492,465 B1 | 12/2002 | Burkhardt et al. |
| 6,559,252 B1 | 5/2003 | Horton et al. |
| 6,608,224 B2 | 8/2003 | Resconi et al. |
| 6,635,779 B1 | 10/2003 | Ewen et al. |
| 6,673,736 B2 | 1/2004 | Kellum et al. |
| 6,777,366 B2 | 8/2004 | Gauthier et al. |
| 6,777,367 B2 | 8/2004 | Gauthier et al. |
| 6,787,616 B2 | 9/2004 | Takemori et al. |
| 6,841,501 B2 | 1/2005 | Resconi et al. |
| 6,846,943 B2 | 1/2005 | Nakano et al. |
| 6,855,783 B2 | 2/2005 | Gauthier et al. |
| 6,870,016 B1 | 3/2005 | Burkhardt et al. |
| 6,878,786 B2 | 4/2005 | Resconi et al. |
| 6,916,886 B2 | 7/2005 | Morioka et al. |
| 6,949,614 B1 | 9/2005 | Schottek et al. |
| 6,953,829 B2 | 10/2005 | Kratzer et al. |
| 6,992,153 B1 | 1/2006 | Collina et al. |
| 7,034,173 B2 | 4/2006 | Schottek |
| 7,122,498 B2 | 10/2006 | Hart et al. |
| 7,141,527 B1 | 11/2006 | Van Baar et al. |
| 7,314,903 B2 | 1/2008 | Resconi et al. |
| 7,342,078 B2 | 3/2008 | Schottek et al. |
| 7,405,261 B2 | 7/2008 | Schulte et al. |
| 7,452,949 B2 | 11/2008 | Okumura et al. |
| 7,569,651 B2 | 8/2009 | Schottek et al. |
| 7,615,597 B2 | 11/2009 | Resconi et al. |
| 7,799,880 B2 | 9/2010 | Ciaccia |
| 7,829,495 B2 | 11/2010 | Floyd et al. |
| 7,964,679 B2 | 6/2011 | Resconi et al. |
| 7,985,799 B2 | 7/2011 | Resconi et al. |
| 8,222,356 B2 | 7/2012 | Kipke et al. |
| 8,299,287 B2 | 10/2012 | Dimeska et al. |
| 8,318,872 B2 | 11/2012 | Savatsky et al. |
| 8,399,375 B2 | 3/2013 | Itan et al. |
| 8,415,492 B2 | 4/2013 | Sell et al. |
| 8,507,706 B2 | 8/2013 | Dimeska et al. |
| 8,557,917 B2 | 10/2013 | Leskinen et al. |
| 8,729,206 B2 | 5/2014 | Resconi et al. |
| 9,193,856 B2 | 11/2015 | Ebata et al. |
| 9,249,239 B2 | 2/2016 | Jian et al. |
| 9,321,914 B2 | 4/2016 | Holtcamp, et al. |
| 9,376,559 B2 | 6/2016 | Holtcamp et al. |
| 9,458,257 B2 | 10/2016 | Funaya et al. |
| 9,458,260 B2 | 10/2016 | Canich, et al. |
| 9,464,145 B2 | 10/2016 | Yang et al. |
| 9,644,047 B2 | 5/2017 | Yang et al. |
| 9,725,537 B2 | 8/2017 | Luo et al. |
| 9,725,569 B2 | 8/2017 | Holtcamp et al. |
| 9,738,779 B2 | 8/2017 | Luo et al. |
| 9,745,390 B2 | 8/2017 | Yang et al. |
| 9,809,664 B2 | 11/2017 | Luo et al. |
| 9,834,628 B2 | 12/2017 | Canich et al. |
| 9,920,176 B2 | 3/2018 | Luo et al. |
| 9,944,665 B2 | 4/2018 | Yang et al. |
| 10,077,325 B2 | 9/2018 | Luo et al. |
| 10,119,016 B2 | 11/2018 | Luo et al. |
| 2001/0053833 A1 | 12/2001 | Nakano et al. |
| 2002/0147105 A1 | 10/2002 | Shamshoum et al. |
| 2003/0171207 A1 | 9/2003 | Shih et al. |
| 2003/0236365 A1 | 12/2003 | Tian et al. |
| 2004/0204310 A1 | 10/2004 | Gauthier et al. |
| 2005/0003951 A1 | 1/2005 | Ferraro et al. |
| 2005/0085376 A1 | 4/2005 | Nagy et al. |
| 2005/0182266 A1 | 8/2005 | Schulte et al. |
| 2007/0004814 A1 | 1/2007 | Resconi et al. |
| 2007/0055021 A1 | 3/2007 | Chandrashekar et al. |
| 2007/0179051 A1 | 8/2007 | Mihan et al. |
| 2009/0018267 A1 | 1/2009 | Vestberg et al. |
| 2009/0062492 A1 | 3/2009 | Luo et al. |
| 2009/0259007 A1 | 10/2009 | Ciaccia |
| 2010/0267907 A1 | 10/2010 | Dimeska et al. |
| 2011/0034649 A1 | 2/2011 | Standaert et al. |
| 2011/0160373 A1 | 2/2011 | Bernreitner et al. |
| 2011/0081817 A1 | 4/2011 | Bieser et al. |
| 2011/0112262 A1 | 5/2011 | Gauthier et al. |
| 2011/0230630 A1 | 9/2011 | Sell et al. |
| 2013/0253124 A1 | 9/2013 | Bernreiter et al. |
| 2013/0345376 A1 | 12/2013 | Luo et al. |
| 2014/0221514 A1 | 8/2014 | Datta et al. |
| 2014/0303308 A1 | 10/2014 | Grestenberger et al. |
| 2014/0357771 A1 | 12/2014 | Tranninger et al. |
| 2015/0025205 A1 | 1/2015 | Yang et al. |
| 2015/0025208 A1 | 1/2015 | Yang et al. |
| 2015/0119537 A1 | 4/2015 | Holtcamp et al. |

(56) References Cited

U.S. PATENT DOCUMENTS

| | | |
|---|---|---|
| 2015/0183893 A1 | 7/2015 | Yang et al. |
| 2016/0032025 A1 | 2/2016 | Giesbrecht |
| 2016/0137763 A1 | 5/2016 | Holtcamp et al. |
| 2016/0244539 A1 | 8/2016 | Resconi et al. |
| 2016/0335619 A1 | 12/2016 | Ye et al. |
| 2016/0355618 A1 | 12/2016 | Luo et al. |
| 2016/0355653 A1 | 12/2016 | Holtcamp et al. |
| 2016/0355654 A1 | 12/2016 | Luo et al. |
| 2016/0355655 A1 | 12/2016 | Luo et al. |
| 2016/0355656 A1 | 12/2016 | Luo et al. |
| 2016/0355657 A1 | 12/2016 | Luo et al. |
| 2017/0253656 A1 | 9/2017 | Penta et al. |
| 2017/0306136 A1 | 10/2017 | Luo et al. |
| 2017/0342175 A1 | 11/2017 | Hagadorn et al. |
| 2018/0022843 A1 | 1/2018 | Luo et al. |
| 2018/0142045 A1 | 5/2018 | Luo |
| 2018/0142046 A1 | 5/2018 | Luo |
| 2018/0162964 A1 | 6/2018 | Yang et al. |
| 2018/0179309 A1 | 6/2018 | Luo et al. |

FOREIGN PATENT DOCUMENTS

| | | |
|---|---|---|
| EP | 0834519 | 4/1998 |
| EP | 1205493 | 5/2002 |
| EP | 1380598 | 1/2004 |
| EP | 1541598 | 6/2005 |
| JP | 2003-073414 | 3/2003 |
| JP | 2012-214709 | 11/2012 |
| WO | 01/48034 | 7/2001 |
| WO | 01/58970 | 8/2001 |
| WO | 02/02575 | 1/2002 |
| WO | 02/02576 | 1/2002 |
| WO | 03/002583 | 1/2003 |
| WO | 03/045551 | 6/2003 |
| WO | 03/051934 | 6/2003 |
| WO | 2004/000899 | 12/2003 |
| WO | 2004/052945 | 6/2004 |
| WO | 2004/092225 | 10/2004 |
| WO | 2004/106351 | 12/2004 |
| WO | 2014/016318 | 1/2014 |
| WO | 2015/065676 | 5/2015 |
| WO | 2015/070360 | 5/2015 |
| WO | 2016/196331 | 12/2016 |
| WO | 2016/196334 | 12/2016 |
| WO | 2016/196339 | 12/2016 |
| WO | 2016/197014 | 12/2016 |
| WO | 2016/197037 | 12/2016 |
| WO | 2017/204830 | 11/2017 |

OTHER PUBLICATIONS

Severn et al., Editors, Tailor-Made Polymers, 2008, p. 103.
U.S. Appl. No. 15/570,814, filed Oct. 31, 2017 Luo et al.
U.S. Appl. No. 15/570,809, filed Oct. 31, 2017 Yang et al.
U.S. Appl. No. 15/570,835, filed Oct. 31, 2017 Luo.
U.S. Appl. No. 15/570,849, filed Oct. 31, 2017 Luo.
U.S. Appl. No. 15/644,528, filed Oct. 26, 2017 Luo et al.
U.S. Appl. No. 15/722,926, filed Oct. 2, 2017 Luo et al.
Resconi et al., "Metallocene Catalysts for Propylene Polymerization," Polypropylene Handbook, Pasquini, Ed., Chapter 2.2, Hanser Publications, Munic, 2005.
Schmidt et al., "Synthesis and characterization of unbridged metallocene dichloride complexes with two differently mono-substituted indenyl ligands and their application as catalysts for the polymerization of ethane and propene," Journal of Molecular Catalysis A: Chemical, 2001, 172 (1-2), pp. 43-65.
Tynys et al., "Ethylene-Propylene Copolymerizations: Effect of Metallocene Structure on Termination Reactions and Polymer Miscrostructure," Macromolecular Chemical Phys., 2005, vol. 206, pp. 1043-1056.
Imhoff et al., "Characterization of Methylaluminoxanes and Determination of Trimethylaluminum Using Proton NMR", Organometallics, 1998, vol. 17, pp. 1941-1945.
Kaminsky, "Highly Active Metallocene Catalysts for Olefin Polymerization ," Journal of Chemical Society, Dalton Trans., 1998, pp. 1413-1418.
Sinn, "Proposals for Structure and Effect of Methylalumoxane Based on Mass Balances and Phase Separation Experiments," Macromolecular Symposia, 1995, vol. 97, Issue 1, pp. 27-52.
Mortazavi et al., "Characterization of MAO-Modified Silicas for Ethylene Polymerization," Journal of Applied Polymer Science, 2013, vol. 130, No. 6, pp. 4568-4575.
Chen et al., "Preparation and characterization of agglomerated porous hollow silica supports for olefin polymerization catalyst," Journal of Non-Crystalline Solids, 2007, vol. 353, No. 11-12, pp. 1030-1036.
Pasquini, N. (Ed.), Polypropylene Handbook, 2005, 2nd Ed., Hanser Publishers, Munich, pp. 78-89.
Shinamoto et al., "Microspherical Silica Supports with High Pore Volume for Metallocene Catalysts," presented at Metallocenes Europe '97 Dusseldorf, Germany, Apr. 8-9, 1997.
Smit et al., "Effects of Methylaluminoxane Immobilization on Silica on the Performance of Zirconocene Catalysts in Propylene Polymerization," Journal of Polymer Science: Part A: Polymer Chemistry, 2005, vol. 43, pp. 2734-2748.
Von Hohenesche et al., "Agglomerated non-porous silica nanoparticles as model carriers in polyethylene synthesis," Journal of Molecular Catalysis A: Chemical, Elsevier, Amsterdam, NL, 2004, vol. 221, No. 1-2, pp. 185-199.
Cecchin et al, "On the Mechanism of Polypropene Growth over MgCl2/TiCl4 Catalyst Systems," Macromolecular Chemistry and Physics, 2001, vol. 202, No. 10, p. 1987-1994.
D'Agnillo et al., "Controlling Molecular Weight Distributions of Polyethylene by Combining Soluble Metallocene/MAO Catalysts," Journal of Polymer Science Part A: Polymer Chemistry, 1998, vol. 36, No. 5, pp. 831-840.
Zheng et al., "Fragmentation Behavior of Silica-Supported Metallocene/MAO Catalysts in the Early Stages of Olefin Polymerization," Macromolecules, 2005, vol. 35, No. 11, pp. 4673-4678.
Tsou, Andy et al. (2019) U.S. Appl. No. 16/460,260, filed Jul. 2, 2019 "Preparation of Bimodal Rubber, Thermoplastic Vulcanizates and Articles Made Therefrom."

PRODUCTION OF HETEROPHASIC POLYMERS IN GAS OR SLURRY PHASE

PRIORITY

This application is the National Stage application for PCT/US2016/034768, filed May 27, 2016. This application also claims priority to and the benefit of U.S. Ser. No. 62/205,977, filed Aug. 17, 2015; U.S. Ser. No. 62/206,004, filed Aug. 17, 2015; U.S. Ser. No. 62/171,616, filed Jun. 5, 2015; and U.S. Ser. No. 62/171,590, filed Jun. 5, 2015.

CROSS REFERENCE TO RELATED APPLICATIONS

This invention also relates to: concurrently filed PCT Application No. PCT/US2016/034755, filed May 27, 2016 entitled, "Supported Metallocene Catalyst Systems for Polymerization;" PCT Application No. PCT/US2016/034784, filed May 27, 2016 entitled, "Metallocene Catalyst Compositions and Polymerization Process Therewith," and PCT Application No. PCT/US2016/034760, filed May 27, 2016 entitled, "Single Reactor Production of Polymers in Gas or Slurry Phase."

FIELD OF THE INVENTION

This invention relates to methods for the production of heterophasic polymers in gas and slurry phase polymerization processes, and polymer compositions made therefrom.

BACKGROUND OF THE INVENTION

Sticky rubbers and plastomers, including heterophasic polymers comprising such, generally must be produced in solution phase polymerization processes utilizing a solvent at temperatures above 120° C., and typically above 135° C. This has been necessary to prevent reactor fouling. The reactor effluent in these processes is a liquid solution comprising the rubber or plastomer and a substantial amount of solvent. To obtain the final product, the solvent must be separated from the rubber or plastomer. To do this, the reactor effluent is typically heated under pressure in a separator to create a solvent-rich phase and a rubber- or plastomer-rich phase, and then both phases will need further separation by bifractionation. The process is time-consuming and not cost effective.

It would be more efficient and economical to polymerize rubbers and plastomers using a supported catalyst system in gas or slurry phase processes. Gas phase processes do not require substantial use of solvents or the corresponding sophisticated separation processes. In these processes, the reactor is typically a fluidized bed comprising monomer and comonomer primarily in the gas phase and fluidized solid particles comprising catalyst components and polymer. The reactor effluent comprises solid polymer granules, rather than a liquid solution of polymer in solvent. Slurry processes, on the other hand, still use substantial amounts of solvents but usually involve much simpler processes for separating solvent from the product than solution phase processes.

Both gas and slurry processes, however, have conventionally been limited in their ability to make rubbers, plastomers, or random copolymers (RCPs), as well as heterophasic polymers comprising such, without reactor fouling. Some semicrystalline rubbers can be produced in gas or slurry processes, but these processes require the addition of an anti-sticking agent such as carbon black to the reactor to reduce the possibility of fouling and assist in polymer handling. As such, the processes are extremely messy and often require dedicated equipment to prevent contamination. It would be advantageous to be able make rubbers and plastomers in gas or slurry phase without the requirement of anti-sticking agents.

Recently, efforts have also been made to prepare heterophasic polymers, such as an impact copolymer (ICP) having a stiff porous matrix phase and a sticky phase filling the pores of the matrix, using newly developed supported metallocene (MCN) catalysis technology to capitalize on the benefits such catalysts provide. Polymers prepared with such single-site catalysts often have narrow molecular weight and composition distributions, low extractables, and a variety of other favorable properties. Unfortunately, common MCN, immobilized on a conventional support coated with an activator such as methylalumoxane (MAO), has not been able to provide copolymer components with sufficiently high sticky phase (e.g., rubber) loadings under commercially relevant process conditions. The pore surface area of the stiff matrix phase derived from these conventionally supported catalyst systems is generally not high enough to fill a sufficient amount of sticky phase in the pores of the matrix. The formation of rubber or plastomer in a separate phase outside the matrix is undesirable because it can result in severe reactor fouling.

The structure of the support used in a catalyst system can affect the structure of the polymer produced. Highly porous supports, such as high surface area silicas, have been used in polymerization processes. However, such supports have not generally been used in sequential polymerization processes for making heterophasic polymers comprising sticky fill phases, likely because of the potential for such supports to reduce the mechanical strength of the matrix phase. A highly porous support (e.g., having high surface area) may generate a more porous polymer than a less porous support, other factors being equal. This is desirable for the matrix phase of an ICP because it can hold more fill phase polymer. However, the more porous polymer may have reduced pore wall thickness, resulting in a reduction in mechanical strength of the matrix phase that is not acceptable for most applications.

Background references on the use of high surface area silicas include WO 2004/092225, which discloses MCN polymerization catalysts supported on silica having a 10-50 μm particle size (PS), 200-800 $m^2/g$ surface area (SA), and 0.9 to 2.1 mL/g pore volume (PV), and shows an example of a 97 μm PS, 643 $m^2/g$ SA and 3.2 mL/g PV silica (p. 12, Table I, support E (MS3060)) used to obtain isotactic polypropylene (pp. 18-19, Tables V and VI, run 21).

EP 1 380 598 discloses certain MCN catalysts supported on silica having a 2-12 μm PS, 600-850 $m^2/g$ SA, and 0.1 to 0.8 mL/g PV, and shows an example of silica having a 6.9 μm PS, 779 $m^2/g$ SA and 0.23 mL/g PV (p. 25, Table 3, Ex. 16) to obtain polyethylene.

EP 1 541 598 discloses certain MCN catalysts supported on silica having a 2 to 20 μm PS, 350-850 $m^2/g$ SA, and 0.1 to 0.8 mL/g PV (p. 4, lines 15-35), and shows an example of a 10.5 μm PS, 648 $m^2/g$ SA and 0.51 mL/g PV silica (see p. 17, Example 12) for an ethylene polymerization.

EP 1 205 493 describes a 1126 $m^2/g$ SA and 0.8 cc/g structural porous volume (small pores only) silica support used with an MCN catalyst for ethylene copolymerization (Examples 1, 6, and 7).

JP 2003073414 describes a 1 to 200 μm PS, 500 $m^2/g$ or more SA, and 0.2 to 4.0 mL/g PV silica, but shows examples of propylene polymerization with certain MCNs where the silica has a PS of 12 μm and 20 μm.

JP 2012214709 describes 1.0 to 4.0 μm PS, 260 to 1000 m²/g SA, and 0.5 to 1.4 mL/g PV silica used to polymerize propylene.

Other references of interest include US 2011/0034649; US 2011/0081817; Madri Smit et al., Journal of Polymer Science: Part A: Polymer Chemistry, Vol. 43, pp. 2734-2748 (2005); and "Microspherical Silica Supports with High Pore Volume for Metallocene Catalysts," Ron Shinamoto and Thomas J. Pullukat, presented at "Metallocenes Europe '97 Dusseldorf, Germany, Apr. 8-9, 1997.

None of the references discussed disclose use of a high surface area support in a sequential polymerization process to produce a heterophasic polymer comprising a stiff porous matrix phase and a sticky fill phase. There is need for new catalyst systems and processes that enable such polymers to be produced in gas and slurry phase polymerization processes without the use of substantial amounts of solvents and/or anti-sticking agents. There is need for processes that take advantage of the favorable properties that a highly porous support and MCN catalysis technology can provide to produce materials that meet the needs of particular applications, such as providing one or more of: improved economics by making sticky polymers in low cost in use processes, improved toughness or other properties, low extractables, bimodal MWD, bimodal composition distribution, bimodal particle size distribution (PSD), a high fill loading of a fill phase polymer in a matrix phase polymer, and combinations thereof. There is a need for gas and slurry phase processes that enable the preparation of bimodal compositions comprising one or more of ethylene- and propylene-based rubbers, RCPs, and ethylene-based plastomers using a single catalyst system.

SUMMARY OF THE INVENTION

The invention is directed to methods for making heterophasic polymers, the methods comprising:

a. contacting a single-site catalyst precursor, an activator, and a support to produce a catalyst system, wherein the support comprises silica and is characterized by an average surface area of from 400 m²/g to 800 m²/g;

b. contacting a monomer and optionally a comonomer in at least one gas or slurry phase reactor with the catalyst system under polymerization conditions comprising a first molar ratio of monomer to comonomer of from 90:10 to 100:1, to produce a porous matrix phase comprising a random statistical distribution of comonomer units;

c. adjusting, in the presence of the matrix phase, the polymerization conditions to a second molar ratio of monomer to comonomer of from 90:10 to 10:90 to produce a fill phase at least partially filling pores in the matrix phase; and d. recovering a reactor effluent comprising a granular heterophasic polymer.

The invention is also directed to polymers comprising a porous matrix phase, the matrix phase comprising at least 90 mol % monomer and from 0 to 10 mol % comonomer, based on the total moles of monomer and comonomer in the matrix phase; a porosity of 20% or more as determined by mercury intrusion porosimetry; a median pore diameter of 165 μm or less as determined by mercury intrusion porosimetry; a random statistical distribution of monomer units; and a composition distribution breadth index of 50% or more. The polymers also comprise a fill phase at least partially filling pores in the matrix phase, wherein the fill phase is from 12 to 90 wt % of the polymer, based on the total weight of the matrix and fill phase. The monomer to comonomer molar ratio in the fill phase is from 80:20 to 20:80.

DEFINITIONS AND MEASUREMENTS

Figure 1:
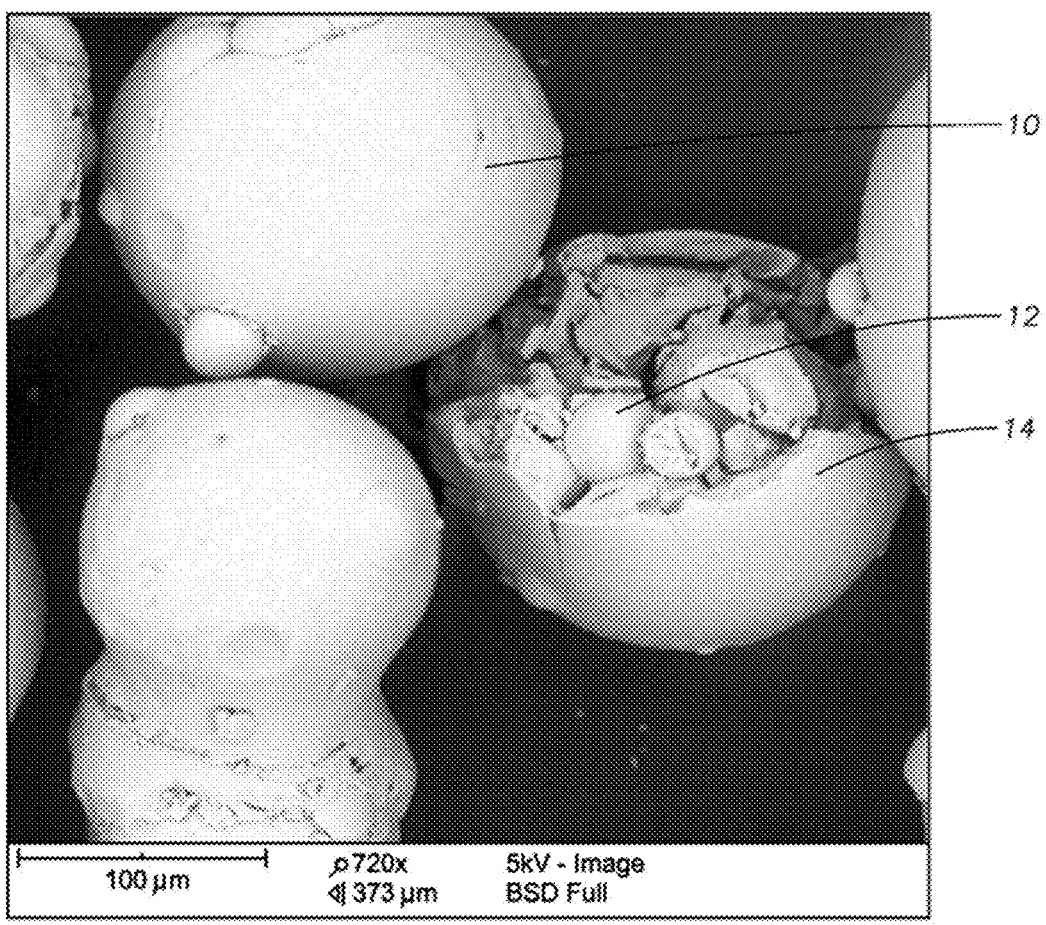
FIG. 1 is an electron micrograph showing D 150-60A silica (AGC Chemicals Americas, Inc.) comprising agglomerated primary particles of desired sizes.

For purposes of this disclosure, the new numbering scheme for the Periodic Table Groups is used as described in CHEMICAL AND ENGINEERING NEWS, 63(5), p. 27 (1985).

For purposes herein, particle size (PS), and distributions thereof, may be determined by laser diffraction using a LS 13 320 Laser Diffraction Particle Size Analyzer with a Micro Liquid Module (range of 0.4 to 2000 μm), available from Beckman Coulter, Inc., Brea, Calif. Unless otherwise indicated expressly or by context, "particle" refers to the overall particle body or assembly such as an aggregate, agglomerate, or encapsulated agglomerate, rather than subunits or parts of the body such as the "primary particles" in agglomerates or the "elementary particles" in an aggregate.

For purposes herein, the surface area (SA, also called the specific surface area or BET surface area), pore volume (PV), and mean or average pore diameter (PD) of catalyst support materials may be determined by the Brunauer-Emmett-Teller (BET) method using adsorption-desorption of nitrogen (temperature of liquid nitrogen: 77 K) with a MICROMERITICS ASAP 2420 instrument after degassing for 4 hours at 130° C. for silica or 40-60° C. for silica supported MAO or finished catalysts. More information regarding the method can be found, for example, in "Characterization of Porous Solids and Powders: Surface Area, Pore Size and Density", S. Lowell et al., Springer, 2004. PV refers to the total PV, including both internal and external PV.

For purposes herein, porosity of polymer particles refers to the volume fraction or percentage of PV within a particle or body comprising a skeleton or matrix of the polymer, on the basis of the overall volume of the particle or body with respect to total volume. The porosity and median PD of polymer particles may be determined using mercury intrusion porosimetry. The mercury intrusion porosimetry method used herein involves placing the sample in a penetrometer and surrounding the sample with mercury. Mercury is a non-wetting liquid to most materials and resists entering voids, doing so only when pressure is applied. The pressure at which mercury enters a pore is inversely proportional to the size of the opening to the void. As mercury is forced to enter pores within the sample material, it is depleted from a capillary stem reservoir connected to the sample cup. The incremental volume depleted after each pressure change is determined by measuring the change in capacity of the stem. This intrusion volume is recorded with the corresponding pressure. Unless otherwise specified, all porosimetry data may be obtained using an AUTOPORE IV 9500 mercury porosimeter, available from MICROMERITICS ANALYTICAL SERVICES.

The matrix phase of a porous, particulated material in which the pores are formed is inclusive of nonpolymeric and/or inorganic inclusion material within the matrix, e.g., catalyst system materials including support material, active catalyst system particles, catalyst system residue particles, or a combination thereof. As used herein, "total volume" of a matrix refers to the volume occupied by the particles comprising the matrix phase, i.e., excluding interstitial spaces between particles but inclusive of interior pore volumes or internal porosity within the particles. "Internal" or "interior" pore surfaces or volumes refer to pore surfaces and/or volumes defined by the surfaces inside the particle which cannot be contacted by other similar particles, as opposed to external surfaces which are surfaces capable of contacting another similar particle.

Where the matrix phase polymer is wholly or partially filled, e.g., in the context of the pores containing a fill phase polymer, the porosity also refers to the fraction of the void spaces or pores within the particle or body regardless of whether the void spaces or pores are filled or unfilled, i.e., the porosity of the particle or body is calculated by including the volume of the fill material as void space as if the fill material were not present.

The term "agglomerate" as used herein refers to a material comprising an assembly of primary particles held together by adhesion, i.e., characterized by weak physical interactions such that the particles can easily be separated by mechanical forces, e.g., particles joined together mainly at corners or edges. The term "primary particles" refers to the smallest, individual disagglomerable units of particles in an agglomerate (without fracturing), and may in turn be an encapsulated agglomerate, an aggregate or a monolithic particle. Agglomerates are typically characterized by having an SA not appreciably different from that of the primary particles of which they are composed. Silica agglomerates are prepared commercially, for example, by a spray drying process.

"Aggregates" are an assembly of elementary particles sharing a common crystalline structure, e.g., by a sintering or other physico-chemical process such as when the particles grow together. Aggregates are generally mechanically unbreakable, and the specific surface area of the aggregate is substantially less than that of the corresponding elementary particles. An "elementary particle" refers to the individual particles or grains in or from which an aggregate has been assembled. For example, the primary particles in an agglomerate may be elementary particles or aggregates of elementary particles. For more information on agglomerates and aggregates, see Walter, D., Primary Particles—Agglomerates—Aggregates, in Nanomaterials (ed Deutsche Forschungsgemeinschaft), Wiley-VCH Verlag GmbH & Co. KGaA, Weinheim, Germany, doi: 10.1002/9783527673919, pp. 1-24 (2013).

Figure 2:
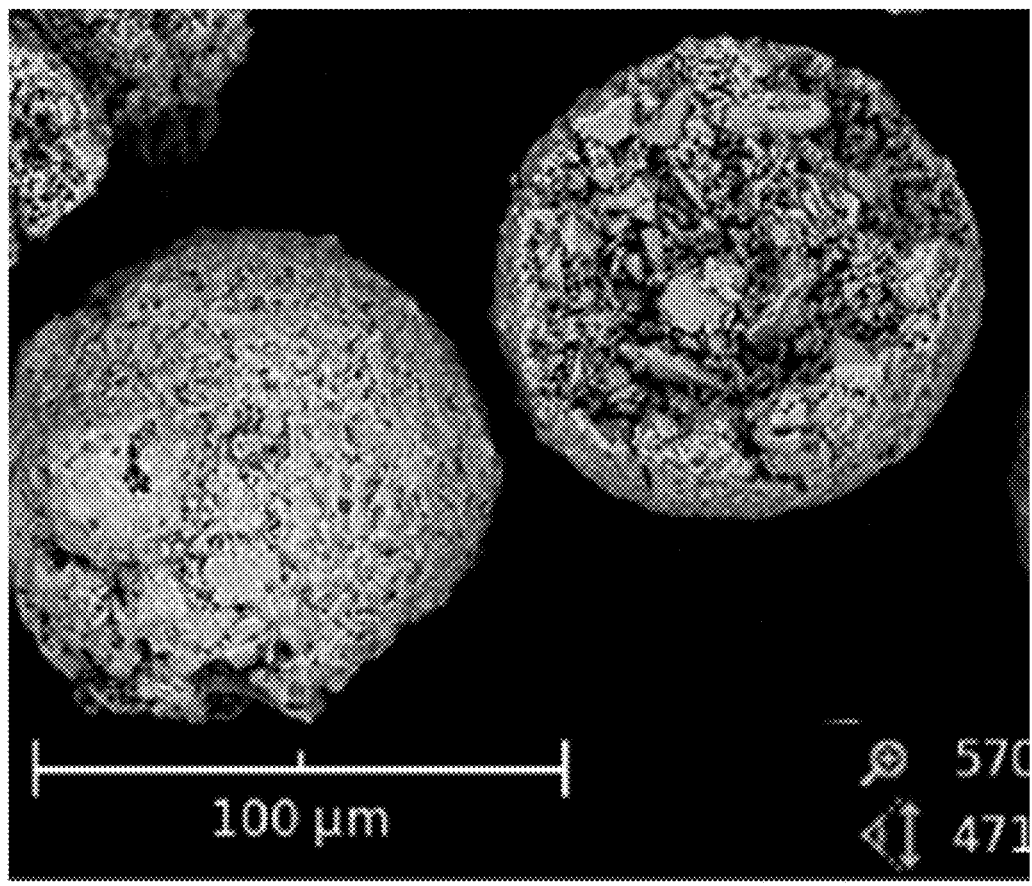
FIG. 2 is an electron micrograph showing PD 14024 silica (PQ Corporation) comprising agglomerated primary particles of desired sizes.
Figure 3:
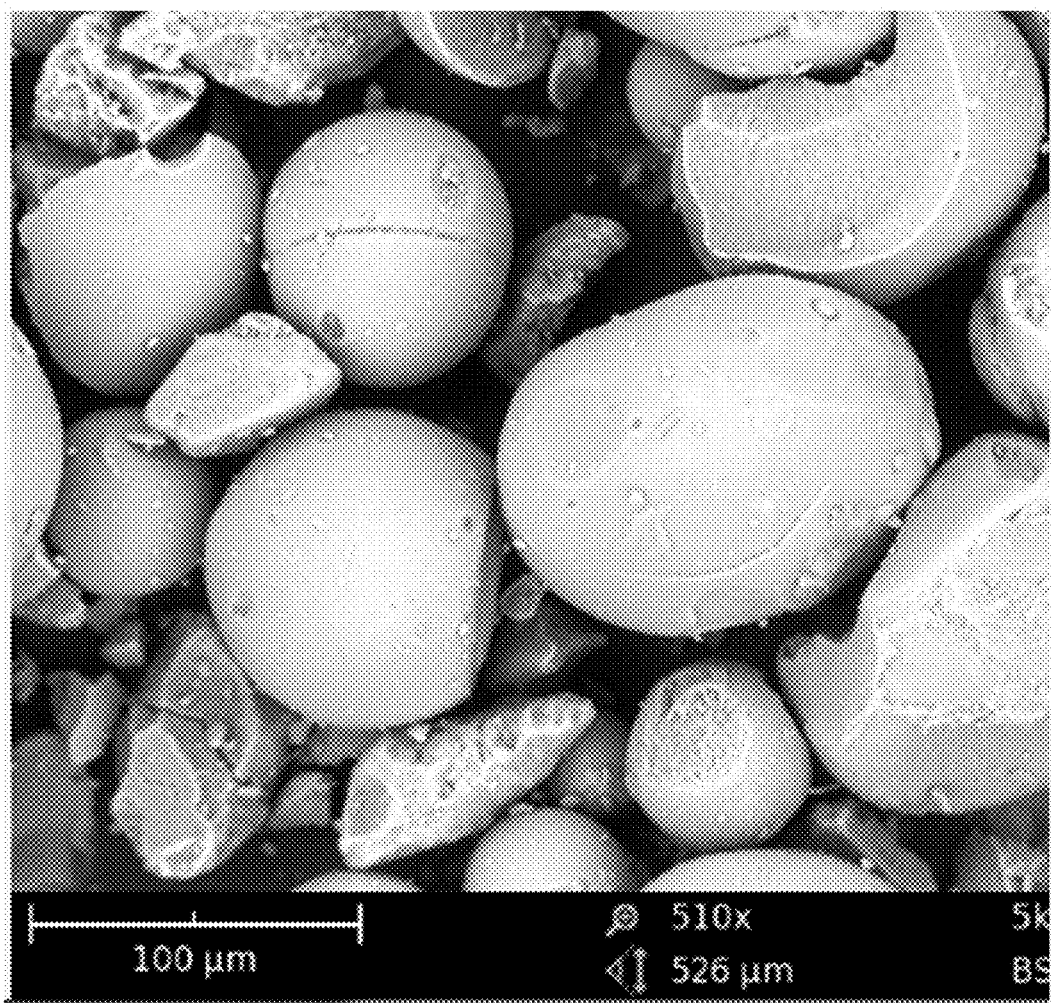
FIG. 3 is an electron micrograph showing a comparative MS 3050 silica (PQ Corporation), not comprising agglomerated primary particles.

The terms "monolith" or "monolithic" refer to a material formed of a single mass of material, and include aggregates as well as bulk materials without any defined geometry or grain structure. FIG. 3 shows a comparative support MS 3050 (PQ Corporation), comprised of generally spherical particles 20 with an entirely aggregated or monolithic core 22, lacking the agglomerated primary particles and internal pore morphology of the FIGS. 1-2 supports. FIG. 3 visually shows no primary (or sub-) particle structures inside a main particle for silica MS3050 with a smooth surface (small pores).

The terms "capsule" or "encapsulated" or "microencapsulated" are used interchangeably herein to refer to an agglomerate in the 1-1000 µm size range comprising an exterior surface that is coated or otherwise has a physical barrier that inhibits disagglomeration of the primary particles from the interior of microencapsulated agglomerate. The barrier or coating may be an aggregate, for example, of primary and/or elementary particles otherwise constituted of the same material as the agglomerate. FIGS. 1-2 show examples of microencapsulated agglomerates 10 comprised of a plurality of primary particles 12 within an outer aggregate surface or shell 14 that partially or wholly encapsulates the agglomerates, in which the primary particles may be allowed to disagglomerate by fracturing, breaking, dissolving, chemically degrading or otherwise removing all or a portion of the shell 14.

FIGS. 1-2 show examples of encapsulated agglomerates 10, which, as seen in the partially opened particles, are comprised of a plurality of primary particles 12. FIG. 1 shows an electron micrograph of D 150-60A silica (Asahi Glass Co., Ltd. Or AGC Chemicals Americas, Inc.), which appears as generally spherical particles or grains 10 which, as seen in a partially opened particle, are actually agglomerates comprised of a plurality of substructures or primary particles 12 within the outer spherical shell or aggregate surface 14 that partially or wholly encapsulates the agglomerates. FIG. 1 visually shows primary (or sub-) particle containing structures inside a main particle for silica D150-60A, but with a smooth surface (small pores), and is a silica suitable for use herein. Likewise, FIG. 2 is an electron micrograph of PD 14024 (PQ Corporation), showing interior agglomerates comprised of around 0.01-20 µm primary particles and an encapsulating aggregate. FIG. 2 visually shows primary (or sub-) particle containing structures inside a main particle for silica PD 14024 with a porous surface (larger pores), and is also suitable for use herein and more preferred than the silica of FIG. 1 for some applications. The examples shown are for illustrative purposes only and the sizes of the particles shown may not be representative of a statistically larger sample. The majority of the primary particles in this or other commercially available silicas may be larger or smaller than the image illustrated, e.g., 2 µm or smaller, depending on the particular silica production process employed by the manufacturer.

In the case of spray dried, amorphous, hydrated-surface silica as one example, the agglomerates 10 may typically have an overall size range of 1-300 µm (e.g., 30-200 µm), the primary particles 12 a size range of 0.001-50 µm or 0.01-20 µm (e.g., 50-400 nm or 1-50 µm), and the elementary particles a size range of 1-400 nm (e.g., 5-40 nm). As used herein, "spray dried" refers to metal oxide such as silica obtained by expanding a sol in such a manner as to evaporate the liquid from the sol, e.g., by passing the silica sol through a jet or nozzle with a hot gas.

Fragmentation is defined as a particle, including a support particle (e.g., silica), a supported activator particle (e.g., silica supported MAO), or a supported finished catalyst system (e.g., a MCN compound activated on the silica supported MAO), separating into at least two particles, with at least one fragmented particle becoming smaller than the non-fragmented particle. Fragmentation can occur by the external application of thermal forces such as high heat during calcination of support particles, and/or the presence of mechanical forces from crushing under compression or from the impact of moving particles into contact with other particles and/or onto fixed surfaces, sometimes referred to as "agitation fragmentation." Fragmentation can also result from the insertion, expansion and/or other interaction of materials in connection with pores of the particles. For example, when large MAO molecules are inserted into small pores, e.g., less than 60 μm, some MAO molecules may solidify and fall out of the pores as solid MAO particles comprising little to no fragmented silica particles. This is especially possible during a heat treatment process in catalyst preparation or activation. This type of fragmentation is referred to herein as "expansion fragmentation" and/or "expansion dis agglomeration."

Another type of fragmentation is fragmentation during the polymerization process, where the polymer grows, fills the support pores, and forces a supported catalyst particle to fragment. This is referred to herein as "polymerization fragmentation." While polymerization fragmentation is desired herein, the other types of fragmentation should generally be avoided or limited. There are some exceptions to this. For example, one may purposefully produce fragmented particles, for example, to form two distinct types of supported catalyst particles with different performance attributes.

For purposes herein, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the "mer" unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like.

The term "heterophasic" refers to the presence of two or more morphological phases in a composition comprising two or more polymers, where each phase comprises a different polymer or a different ratio of the polymers as a result of partial or complete immiscibility (i.e., thermodynamic incompatibility). A common example is a morphology consisting of a continuous matrix phase and at least one dispersed or discontinuous phase. The dispersed phase takes the form of discrete domains (particles) distributed within the matrix (or within other phase domains, if there are more than two phases). Another example is a co-continuous morphology, where two phases are observed but it is unclear which one is the continuous phase, and which is the discontinuous phase, e.g., where a matrix phase has generally continuous internal pores and a fill phase is deposited within the pores, or where the fill phase expands within the pores of an initially globular matrix phase to expand the porous matrix globules, corresponding to the polymer initially formed on or in the support agglomerates, into subglobules which may be partially or wholly separated and/or co-continuous or dispersed within the fill phase, corresponding to the polymer formed on or in the primary particles of the support. For example, a polymer globule may initially have a matrix phase with a porosity corresponding to the support agglomerates, but a higher fill phase due to expansion of the fill phase in interstices between subglobules of the matrix phase.

The presence of multiple phases is determined using microscopy techniques, e.g., optical microscopy, scanning electron microscopy (SEM), or atomic force microscopy (AFM); or by the presence of two glass transition (Tg) peaks in a dynamic mechanical analysis (DMA) experiment; or by a physical method such as solvent extraction, e.g., xylene extraction at an elevated temperature to preferential separate one polymer phase; in the event of disagreement among these methods, DMA performed according to the procedure set out in US 2008/0045638 at page 36, including any references cited therein, shall be used.

The term "sequential polymerization" refers to a polymerization process wherein different polymers are produced at different periods of time in the same or different reactors, e.g., to produce a multimodal and/or heterophasic polymer.

The term "rubber" herein refers to a copolymer comprising at least two different monomers in a molar ratio of M1:M2 from 20:80 to 80:20, where M1 is a first monomer and M2 is a second monomer, such as a comonomer. Where more than one comonomer is used, M2 includes all of the comonomers.

The term "plastomer" herein refers to a copolymer comprising ethylene and at least one alpha-olefin comonomer having 3 to 12 carbon atoms, where the ethylene:total comonomer molar ratio is from 80:20 to 99.9:0.1.

The terms "random copolymer" or "RCP" herein refer to a copolymer comprising propylene and at least one alpha-olefin comonomer having 2 or 4 to 12 carbon atoms, where the propylene:total comonomer molar ratio is from 80:20 to 99.9:0.1.

The term "bimodal composition distribution" herein means that the matrix phase and the fill phase of the heterophasic polymer each have a different monomer: total comonomer ratio.

As used herein, Mn is number average molecular weight, Mw is weight average molecular weight, Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weights (e.g., Mw, Mn, and Mz) are g/mol and are determined by GPC-IR as described below.

Ambient temperature, also referred to herein as room temperature (RT), is 23° C. unless otherwise indicated.

In the description herein, a metallocene catalyst is defined as an organometallic compound (and may sometimes be referred to as such in context) with at least one π-bound cyclopentadienyl moiety (or substituted cyclopentadienyl moiety) and more frequently two π-bound cyclopentadienyl moieties or substituted cyclopentadienyl moieties. Indene, substituted indene, fluorene and substituted fluorene are all substituted cyclopentadienyl moieties.

An organometallic compound is defined as a compound containing at least one bond between a carbon atom of an organic compound and a metal, and is typically, although not always, capable of deprotonating hydroxyl groups, e.g., from a support material. A deprotonating agent is defined as a compound or system capable of deprotonating hydroxyl groups from the support, and may be an organometallic or another compound such as a metal amide, e.g., aluminum amide or lithium amide.

An "anionic ligand" is a negatively charged ligand, which donates one or more pairs of electrons to a metal ion. A "neutral donor ligand" is a neutrally charged ligand, which donates one or more pairs of electrons to a metal ion.

The terms "hydrocarbyl radical," "hydrocarbyl," and "hydrocarbyl group" are used interchangeably throughout this document. Likewise, the terms "group," "radical," and "substituent" are also used interchangeably in this document. For purposes of this disclosure, "hydrocarbyl radical" is defined to be a radical, which contains hydrogen atoms and up to 100 carbon atoms and which may be linear, branched, or cyclic, and when cyclic, aromatic or non-aromatic. A substituted hydrocarbyl radical is a hydrocarbyl radical where at least one hydrogen has been replaced by a heteroatom or heteroatom containing group.

Halocarbyl radicals are radicals in which one or more hydrocarbyl hydrogen atoms have been substituted with at least one halogen (e.g., F, Cl, Br, I) or halogen-containing group (e.g., $CF_3$).

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like, where $R^*$ is independently a hydrocarbyl or halocarbyl radical and two or more $R^*$ may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^*_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like, where $R^*$ is independently a hydrocarbyl or halocarbyl radical and two or more $R^*$ may join together to form a substituted or unsubstituted saturated, partially unsaturated or aromatic cyclic or polycyclic ring structure.

Polar radicals or polar groups are groups in which a heteroatom functionality is bonded directly to the indicated atom or atoms. They include heteroatoms of groups 1-17 either alone or connected to other elements by covalent or other interactions, such as ionic, van der Waals forces, or hydrogen bonding. Examples of functional groups include carboxylic acid, acid halide, carboxylic ester, carboxylic salt, carboxylic anhydride, aldehyde and their chalcogen (group 14) analogues, alcohol and phenol, ether, peroxide and hydroperoxide, carboxylic amide, hydrazide and imide, amidine and other nitrogen analogues of amides, nitrile, amine and imine, azo, nitro, other nitrogen compounds, sulfur acids, selenium acids, thiols, sulfides, sulfoxides, sulfones, sulfonates, phosphines, phosphates, other phosphorus compounds, silanes, boranes, borates, alanes, aluminates. Functional groups may also be taken broadly to include organic polymer supports or inorganic support material, such as alumina, and silica. Preferred examples of polar groups include $NR^*_2$, $OR^*$, $SeR^*$, $TeR^*$, $PR^*_2$, $AsR^*_2$, $SbR^*_2$, $SR^*$, $BR^*_2$, $SnR^*_3$, $PbR^*_3$ and the like, where $R^*$ is independently a hydrocarbyl, substituted hydrocarbyl, halocarbyl or substituted halocarbyl radical as defined above and two $R^*$ may join together to form a substituted or unsubstituted saturated, partially unsaturated or aromatic cyclic or polycyclic ring structure. Also preferred are sulfonate radicals, $S(=O)_2OR^*$, where $R^*$ is defined as above. Examples include $SO_3Me$ (mesylate), $SO_3$(4-tosyl) (tosylate), $SO_3CF_3$ (triflate), $SO_3(n-C_4F_9)$ (nonaflate), and the like.

An aryl group is defined to be a single or multiple fused ring group where at least one ring is aromatic. Examples of aryl and substituted aryl groups include phenyl, naphthyl, anthracenyl, methylphenyl, isopropylphenyl, tert-butylphenyl, cyclopropyl, cyclobutyl, cyclopentyl, cyclohexyl, carbazolyl, indolyl, pyrrolyl, and cyclopenta[b]thiopheneyl. Preferred aryl groups include phenyl, benzyl, carbazolyl, naphthyl, and the like.

In using the terms "substituted cyclopentadienyl," or "substituted indenyl," or "substituted aryl," the substitution to the aforementioned is on a bondable ring position, and each occurrence is selected from hydrocarbyl, substituted hydrocarbyl, halocarbyl, substituted halocarbyl, silylcarbyl, germylcarbyl, a halogen radical, or a polar group. A "bondable ring position" is a ring position that is capable of bearing a substituent or bridging substituent. For example, cyclopenta[b]thienyl has five bondable ring positions (at the carbon atoms) and one non-bondable ring position (the sulfur atom); cyclopenta[b]pyrrolyl has six bondable ring positions (at the carbon atoms and at the nitrogen atom). Thus, in relation to aryl groups, the term "substituted" indicates that a hydrogen group has been replaced with a hydrocarbyl, substituted hydrocarbyl, halocarbyl, substituted halocarbyl, silylcarbyl, germylcarbyl, a halogen radical, or a polar group. For example, "methyl phenyl" is a phenyl group having had a hydrogen replaced by a methyl group.

As used herein, the term "granular" means that the product is in particle form and preferably free-flowing according to any one or more of the definitions for free-flowing provided herein.

As used herein, "and/or" means either or both (or any or all) of the terms or expressions to which the term is referring.

DETAILED DESCRIPTION OF THE INVENTION

This invention enables a variety of heterophasic polymers comprising rubbers, plastomers, and/or RCPs to be made in gas and slurry phase polymerization processes where this was not previously possible due to fouling problems in the reactor system. The methods use a supported catalyst system comprising a single-site catalyst precursor, an activator, and a support in a sequential, multi-step copolymerization process. Preferred embodiments of the catalyst system, support, activator, catalyst precursor compound, and co-activator are described in more detail below.

Support Materials: The catalyst systems comprise porous solid particles as an inert support material to which the catalyst precursor compound and/or activator may be anchored, bound, adsorbed or the like. The support material comprises an inorganic oxide in a finely divided form. Suitable inorganic oxide materials for use in the single-site catalyst systems herein include groups 2, 4, 13, and 14 metal oxides, such as silica, alumina, magnesia, titania, zirconia, and the like, and mixtures thereof. Also, combinations of these support materials may be used, for example, silica-chromium, silica-alumina, silica-titania, and the like.

In preferred embodiments of the invention, the support material comprises silica, e.g., amorphous silica, which may include a hydrated surface presenting hydroxyl or other groups which can be deprotonated to form reactive sites to anchor activators and/or catalyst precursors. Other porous support materials may optionally be present with the silica as a co-support, for example, talc, other inorganic oxides, zeolites, clays, organoclays, or any other organic or inorganic support material and the like, or mixtures thereof. The support's surface may also be treated with different element-containing agents to form, for example, a silated, aminated, boronated, or halogenated support. The most common support is silica. Silicas which may be suitable are commercially available under the trade designations PD 13054, PD 14024, and PD 15032 (PQ Corporation); D70-120A, D100-100A, and D150-60A (Asahi Glass Co., Ltd. Or AGC Chemicals Americas, Inc.), and the like.

When a silica support is referred to herein, the silica support in raw form comprises at least 60 wt %, 70 wt %, 80 wt %, 90 wt %, 95 wt %, 98 wt %, or 99 wt % or more of silica. The silica support may comprise up to 5 wt %, 10 wt %, 20 wt %, 30 wt %, or 40 wt % of another compound. The other compound may be any other support material discussed herein. The other compound may be a titanium, aluminum, boron, magnesium, or mixtures thereof. Additionally, the other compound may be a talc, other inorganic oxide, zeolite, clay, organoclay, or mixtures thereof. The silica support may also not include any substantial amount of any other compound, i.e., the silica support comprises less than 5 wt %, 1 wt %, 0.5 wt %, 0.2 wt %, or less of any other compound.

Supports useful herein comprise silica and are characterized by a relatively high average surface area of from 400 to 800 m$^2$/g measured with the BET method discussed above, e.g., using the Micromeritics ASAP 2420 surface area/porosity analyzer. The support may also comprise one or more of the following: an average pore diameter of from 60 to 200 Angstrom, at least 20% of the incremental pore volume comprised of pores having a pore diameter larger than 100 Angstrom, specifically in the range of 17-2000 Angstrom covered in the BET method discussed herein, or further including the 2000-10,000 Angstrom range covered in the mercury porosimetry intrusion method discussed herein (e.g., measured with the Autopore IV 9500 series mercury porosimeter), and an activator comprising aluminoxane loading of greater than about 7 mmol, 7.5 mmol, 8 mmol, 8.5 mmol, or 9 mmol Al/g silica.

The support may be spray dried prior to being contacted with the catalyst precursor and/or monomer, and comonomer. For example, the support may be contacted with an activator and then spray dried or spray dried and then contacted with an activator. The spray dried support may comprise agglomerates of a plurality of primary particles, wherein the primary particles have a smaller average particle size relative to the agglomerates. For example, the primary particles may have an average particle size of from 0.001 to 50 μm or 0.01 to 20 μm, and the agglomerates may have an average particle size from 30 μm to 200 μm.

The support may have one or more of the following characteristics:
a) an average PS of more than 30 μm, more than 40 μm, more than 50 μm, more than 60 μm, more than 65 μm, more than 70 μm, more than 75 μm, more than 80 μm, more than 85 μm, more than 90 μm, more than 100 μm, more than 120 μm, and/or up to 200 μm; or less than 180 μm, less than 160 μm, less than 150 μm, less than 130 μm; e.g., 30-200 μm, 50-200 μm, or 60-200 μm;
b) a PV from at least 0.1 mL/g, at least 0.15 mL/g, at least 0.2 mL/g, at least 0.25 mL/g, at least 0.3 mL/g, at least 0.5 mL/g, and/or up to 2 mL/g; or less than 1.6 mL/g, less than 1.5 mL/g, less than 1.4 mL/g, less than 1.3 mL/g; e.g., 0.5-2 mL/g, 0.5-1.5 mL/g, or 1.1-1.6 mL/g;
c) a SA of less than 850 m$^2$/g, less than 800 m$^2$/g, less than 750 m$^2$/g, less than 700 m$^2$/g, less than 650 m$^2$/g, and/or more than 400 m$^2$/g; or more than 600 m$^2$/g, more than 650 m$^2$/g, more than 700 m$^2$/g; e.g., 400-850 m$^2$/g, 600-850 m$^2$/g, 650-850 m$^2$/g, 700-850 m$^2$/g, 400-650 m$^2$/g, or 400-700 m$^2$/g;
d) a mean pore diameter (PD) greater than 6 nm, greater than 7 nm, greater than 8 nm, and/or less than 20 nm; less than 15 nm, less than 13 nm, less than 12 nm, less than 10 nm, less than 8nm, less than 7 nm, or less than 6 nm; e.g., 6-13 nm, 8-13 nm, 7-20 nm, or 8-20 nm;
e) agglomerates composed of a plurality of primary particles, the primary particles having an average PS of 1 nm to less than 50 μm, or 0.1 μm to less than 10 μm;
f) primary particles in agglomerates having a narrow particle size distribution, preferably in the range of D10 not smaller than 80% of D50, and D90 not larger than 120% of D50, and most preferably uniform particles (wherein D10, D50, and D90 represent the 10$^{th}$, 50$^{th}$, and 90$^{th}$ percentile, respectively of the particle size (e.g., diameter) distribution; for example, a D90 of 10 microns means that 90 vol % of the particles have a diameter less than or equal to 10 microns);
g) microencapsulated agglomerates;
h) spray dried;
i) silica, e.g., amorphous silica and/or silica having a hydrated surface; and/or
j) any combination or subcombination thereof.

The support material can be used wet, i.e., containing adsorbed water, or dry, that is, free of absorbed water. The amount of absorbed water can be determined by standard analytical methods, e.g., LOD (loss of drying) from an instrument such as LECO TGA 701 under conditions such as 300° C. for 3 hours. In some embodiments of the invention, wet support material (without calcining) can be contacted with the activator or another organometallic compound as otherwise described below, with the addition of additional organometallic or other scavenger compound that can react with or otherwise remove the water, such as a metal alkyl. For example, contacting wet silica with an aluminum alkyl such as AlMe$_3$, usually diluted in an organic solvent such as toluene, forms in-situ MAO, and if desired additional MAO can be added to control the desired amount of MAO loaded on the support, in a manner otherwise similar as described below for dry silica.

Drying of the support material may be done by heating or calcining above about 100° C., e.g., from about 100° C. to about 1000° C., preferably at least about 200° C. The silica support may be heated to at least 130° C., about 130° C. to about 850° C., or about 200° C. to about 600° C. for a time of 1 minute to about 100 hours, e.g., from about 2 hours to about 72 hours, or from about 24 hours to about 60 hours. The calcined support material may comprise at least some groups reactive with an organometallic compound, e.g., reactive hydroxyl (OH) groups to produce the supported catalyst systems of this invention.

Supportation: The support may be treated with an organometallic compound to react with deprotonated reactive sites on the support surface. In general, the support is treated first with an organometallic activator such as MAO, and then the supported activator is treated with a single-site catalyst precursor compound, such as an MCN compound and optionally a metal alkyl co-activator, although the MCN compound and/or co-activator can be loaded first, followed by contact with the other catalyst system components.

The support material, having reactive surface groups especially after calcining, may be slurried in a non-polar solvent and contacted with the organometallic compound (activator in this example), preferably dissolved in the solvent, preferably for a period of time in the range of from about 0.5 hours to about 24 hours, from about 2 hours to about 16 hours, or from about 4 hours to about 8 hours. Suitable non-polar solvents are materials in which, other than the support material and its adducts, all of the reactants used herein, i.e., the activator, and the single-site catalyst precursor compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

The mixture of the support material and activator (or other organometallic compound) in various embodiments of the invention may generally be heated or maintained at a temperature of from about –60° C. up to about 130 or 140° C., such as, for example: about 40° C. or below, about RT or below, about –20° C. or below; from about 10° C. or 20° C. up to about 60° C. or about 40° C.; RT or about 25° C. or above; or from about 40° C., about 60° C., or about 80° C. up to about 100° C., or about 120° C. Where the support may be susceptible to expansion fragmentation (as defined above) during activator/catalyst precursor supportation (e.g., SA≥650 m$^2$/g, PD≤7 nm), the expansion fragmentation may be controlled through the manipulation of reaction conditions to inhibit fragmentation such as at a lower reaction temperature, e.g., –60-40° C., preferably –20° C.-30° C., to achieve <10 vol % fragmented particles, preferably <5 vol % fragmented particles. For example, for silicas having a surface area of 650-800 m$^2$/g with small average pore diameters and lacking >100 Å distributions, e.g., D150-60A (64 Å) or PD13054 (66 Å), after the addition of MAO usually at cold temperatures (e.g., –40° C.), additional hours of agitation at RT (e.g., 3 hours) can be applied without heat treatment to minimize or prevent expansion fragmentation of the silica supported MAO. For silicas having a surface area of 400-650 m$^2$/g with larger average pore diameters, e.g., D100-100A (110 Å) or D70-120A (120 Å), or a smaller average pore diameter but with substantial >100 ÅA distributions, e.g., PD14024 (92 Å), after the addition of the MAO solution at a cold temperature (e.g., –10° C.), the mixture can be agitated at an elevated temperature (e.g., 100° C.) for a certain time (e.g., 3 hours) to obtain the supported activators.

Maintaining a sufficiently large average PS or PS mode of the supported catalyst system material, according to some embodiments of the invention, facilitates the formation of sufficiently large polymer particles rich with small pores, which can, for example, be readily filled with rubber or plastomer fill, e.g., in making a heterophasic polymer. On the other hand, an excess of porous polymer fines, e.g., 5 vol % or more smaller than 120 μm, generally formed from smaller particles such as the primary particles of the support material agglomerates or sub-primary particle debris or fines, may result in fouling or plugging of the reactor, lines or equipment during the polymerization of a rubber in the presence of the porous polypropylene or vice versa, and/or in the formation of non-particulated polymer.

The supported activator may optionally treated with another organometallic compound which is also selected as the scavenger, preferably a metal alkyl such as an aluminum alkyl, to scavenge any hydroxyl or other reactive species that may be exposed by or otherwise remaining after treatment with the first organometallic compound, e.g., hydroxyl groups on surfaces exposed by fragmentation may be reacted and thereby removed by contact of the fragments with an aluminum alkyl such as triisobutylaluminum (TIBAL). Useful metal alkyls which may be used according to some embodiments of the invention to treat the support material have the general formula R$_n$-M, wherein R is C$_1$ to C$_{40}$ hydrocarbyl such as C$_1$ to C$_{12}$ alkyl, for example, M is a metal, and n is equal to the valence of M, and may include oxophilic species such as diethyl zinc and aluminum alkyls, such as, for example, trimethylaluminum, triethylaluminum, triisobutylaluminum, tri-n-hexylaluminum, tri-n-octylaluminum and the like, including combinations thereof. Then the activator/support material is contacted with a solution of the catalyst precursor compound. In some embodiments of the invention, the supported activator is generated in situ. In alternate embodiments of the invention, the slurry of the support material is first contacted with the catalyst precursor compound for a period of time in the range of from about 0.5 hours to about 24 hours, from about 2 hours to about 16 hours, or from about 4 hours to about 8 hours, and the slurry of the supported MCN compound is then contacted with an organometallic-activator solution and/or organometallic-scavenger solution.

Activators: Activators are compounds used to activate any one of the catalyst precursor compounds described above by converting the neutral catalyst precursor compound to a catalytically active catalyst compound cation. Preferred activators include aluminoxane compounds, including modified aluminoxane compounds.

Aluminoxanes are generally oligomeric, partially hydrolyzed aluminum alkyl compounds containing —Al(R1)-O— sub-units, where R1 is an alkyl group, and may be produced by the hydrolysis of the respective trialkylaluminum compound. Examples of aluminoxane activators include methylaluminoxane (MAO), ethylaluminoxane, butylaluminoxane, isobutylaluminoxane, modified MAO (MMAO), halogenated MAO where the MAO may be halogenated before or after MAO supportation, dialkylaluminum cation enhanced MAO, surface bulky group modified MAO, and the like. MMAO may be produced by the hydrolysis of trimethylaluminum and a higher trialkylaluminum such as triisobutylaluminum. Mixtures of different aluminoxanes may also be used as the activator(s).

There are a variety of methods for preparing aluminoxanes suitable for use in the present invention, non-limiting examples of which are described in U.S. Pat. Nos. 4,665,208; 4,952,540; 5,041,584; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; and 5,939,346 and European publications EP-A-0 561 476; EP-B1-0 279 586; EP-A-0 594-218; and EP-B 1-0 586 665, and PCT publications WO 94/10180 and WO 99/15534; halogenated MAO are described in U.S. Pat. Nos. 7,960,488; 7,355,058; and 8,354,485; dialkylaluminum cation enhanced MAO are described in US 2013/0345376; and surface bulky group modified supported MAO are described in U.S. Pat. Nos. 8,895,465 and 9,090,720, all of which are herein fully incorporated by reference.

The term "non-coordinating anion" (NCA) means an anion which either does not coordinate to a cation or which is only weakly coordinated to a cation thereby remaining sufficiently labile to be displaced by a neutral Lewis base. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator, and stoichiometric ionic activator can be used interchangeably. Likewise, the terms neutral stoichiometric activator, and Lewis acid activator can be used interchangeably. The term non-coordinating anion includes neutral stoichiometric activators, ionic stoichiometric activators, ionic activators, and Lewis acid activators.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in this invention are those that are compatible, stabilize the transition metal cation in the sense of balancing its ionic charge at +1, and yet retain sufficient ability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Boron-containing NCA activators represented by the formula below may be used:

$$(Z)_d{}^+(A^{d-})$$

wherein Z is (L-H) or a reducible Lewis Acid, L is a neutral Lewis base; H is hydrogen; (L-H)$^+$ is a Bronsted acid; A$^{d-}$ is a non-coordinating anion having the charge d−; and d is an integer from 1 to 3.

When Z is (L-H) such that the cation component is (L-H)$_d$+, the cation component may include Bronsted acids such as protonated Lewis bases capable of protonating a moiety, such as an alkyl or aryl, from the bulky ligand metallocene containing transition metal catalyst precursor, resulting in a cationic transition metal species. When Z is a reducible Lewis acid it may be represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid is represented by the formula: (Ph$_3$C$^+$), where Ph is phenyl or phenyl substituted with a heteroatom, a C$_1$ to C$_{40}$ hydrocarbyl, or a substituted C$_1$ to C$_{40}$ hydrocarbyl. The reducible Lewis acid may be triphenyl carbenium.

The anion component A$^{d-}$ may include those having the formula [M$^{k+}$Q$_n$]$^{d-}$ wherein k is 1, 2, or 3; n is 1, 2, 3, 4, 5, or 6, preferably 3, 4, 5 or 6; n−k=d; M is an element selected from group 13, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halo-substituted-hydrocarbyl radicals, said Q having up to 20 carbon atoms with the proviso that in not more than one occurrence is Q a halide, and two Q groups may form a ring structure. Each Q may be a fluorinated hydrocarbyl group having 1 to 20 carbon atoms, a fluorinated aryl group, or a pentafluoro aryl group. Examples of suitable A$^{d-}$ components also include diboron compounds as disclosed in U.S. Pat. No. 5,447,895, which is fully incorporated herein by reference.

In any NCAs represented by formula 2 above, the reducible Lewis acid is represented by the formula: (Ar$_3$C+), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid is represented by the formula: (Ph$_3$C+), where Ph is phenyl or phenyl substituted with a heteroatom, a C$_1$ to C$_{40}$ hydrocarbyl, or a substituted C$_1$ to C$_{40}$ hydrocarbyl.

Bulky activators may also be useful herein. A "Bulky activator" as used herein refers to anionic activators represented by the formula:

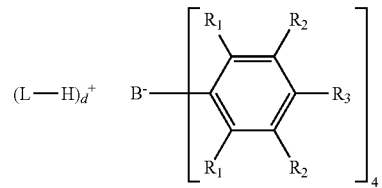

where:
each R$_1$ is, independently, a halide, preferably a fluoride;
each R$_2$ is, independently, a halide, a C$_6$ to C$_{20}$ substituted aromatic hydrocarbyl group or a siloxy group of the formula —O—Si—R$_a$, where R$_a$ is a C$_1$ to C$_{20}$ hydrocarbyl or hydrocarbylsilyl group (preferably R$_2$ is a fluoride or a perfluorinated phenyl group);
each R$_3$ is a halide, C$_6$ to C$_{20}$ substituted aromatic hydrocarbyl group or a siloxy group of the formula —O—Si—R$_a$, where R$_a$ is a C$_1$ to C$_{20}$ hydrocarbyl or hydrocarbylsilyl group (preferably R$_3$ is a fluoride or a C$_6$ perfluorinated aromatic hydrocarbyl group); wherein R$_2$ and R$_3$ can form one or more saturated or unsaturated, substituted or unsubstituted rings (preferably R$_2$ and R$_3$ form a perfluorinated phenyl ring);
L is a neutral Lewis base; (L-H)$^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3V$_s$, where V$_s$ is the scaled volume. V$_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| 1st short period, Li to F | 2 |
| 2nd short period, Na to Cl | 4 |
| 1st long period, K to Br | 5 |
| 2nd long period, Rb to I | 7.5 |
| 3rd long period, Cs to Bi | 9 |

For a list of possibly useful bulky activators see U.S. Pat. No. 8,658,556, which is incorporated by reference herein. Additionally, an NCA activator may be chosen from the activators described in U.S. Pat. No. 6,211,105, which is incorporated by reference herein.

It is also within the scope of this invention to use activators that are a combination of alumoxanes and NCAs (see for example, U.S. Pat. Nos. 5,153,157; 5,453,410; EP 0 573 120; WO 94/07928; and WO 95/14044 which discuss the use of an alumoxane in combination with an ionizing activator).

Optional Scavengers or Co-Activators: In addition to the activator compounds, scavengers or co-activators may be used. Suitable co-activators may be selected from the group consisting of: trialkylaluminum, dialkylmagnesium, alkylmagnesium halide, and dialkylzinc. Aluminum alkyl or organoaluminum compounds which may be utilized as scavengers or co-activators include, for example, trimethylaluminum (TMA), triethylaluminum (TEAl), triisobutylaluminum (TIBAL), tri-n-hexylaluminum, tri-n-octylaluminum, and the like. Other oxophilic species, such as diethyl zinc may be used. As mentioned above, the organometallic compound used to treat the calcined support material may be a scavenger or co-activator, or may be the same as or different from the scavenger or co-activator. In an embodiment, the co-activator is selected from the group consisting of: trimethylaluminum, triethylaluminum, triisobutylaluminum, tri-n-octylaluminum, trihexylaluminum, and diethylzinc (alternately the group consisting of: trimethylaluminum, triethylaluminum, triisobutylaluminum, trihexylaluminum, tri-n-octylaluminum, dimethylmagnesium, diethylmagnesium, dipropylmagnesium, diisopropylmagnesium, dibutyl magnesium, diisobutylmagnesium, dihexylmagnesium, dioctylmagnesium, methylmagnesium chloride, ethylmagnesium chloride, propylmagnesium chloride, isopropylmagnesium chloride, butyl magnesium chloride, isobutylmagnesium chloride, hexylmagnesium chloride, octylmagnesium chloride, methylmagnesium fluoride, ethylmagnesium fluoride, propylmagnesium fluoride, isopropylmagnesium fluoride, butyl magnesium fluoride, isobutylmagnesium fluoride, hexylmagnesium fluoride, octylmagnesium fluoride, dimethylzinc, diethylzic, dipropylzinc, and dibutylzinc).

Single-Site Catalyst Precursor Compounds: Single-site catalyst precursor compounds including metallocenes and non-metallocenes can be used. Metallocene catalyst precursor compounds may be represented by the following formula: $(Cp)_m R^4{}_n M^4 Q_k$; wherein each Cp is a cyclopentadienyl, indenyl, or fluorenyl moiety substituted by one or more hydrocarbyl radicals having from 1 to 20 carbon atoms; $R^4$ is a bridge between two Cp rings; $M^4$ is a transition metal selected from group 4 or 5; Q is a hydride or a hydrocarbyl group having from 1 to 20 carbon atoms or an alkenyl group having from 2 to 20 carbon atoms, or a halogen; m is 1, 2, or 3, with the proviso that if m is 2 or 3, each Cp may be the same or different; n is 0 or 1, with the proviso that n=0 if m=1; and k is such that k+m is equal to the oxidation state of $M^4$, with the proviso that if k is greater than 1, each Q may be the same or different.

The single-site catalyst precursor compound may also be represented by the formula: $R^A(CpR''_p)(CpR^*_q)M^5 Q_r$; wherein each Cp is a cyclopentadienyl moiety or substituted cyclopentadienyl moiety; each R* and R'' is a hydrocarbyl group having from 1 to 20 carbon atoms and may the same or different; p is 0, 1, 2, 3, or 4; q is 1, 2, 3, or 4; $R^A$ is a bridge between the Cp moieties imparting stereorigidity to the MCN compound; $M^5$ is a group 4, 5, or 6 metal; Q is a hydrocarbyl radical having 1 to 20 carbon atoms or is a halogen; r is s minus 2, where s is the valence of $M^5$; wherein $(CpR^*_q)$ has bilateral or pseudobilateral symmetry and $R^*_q$ is selected such that $(CpR^*_q)$ forms a fluorenyl, alkyl substituted indenyl, or tetra-, tri-, or dialkyl substituted cyclopentadienyl radical; $(CpR''_p)$ contains a bulky group in one and only one of the distal positions, wherein the bulky group is of the formula $AR^W{}_v$ and A is chosen from Group 4 metals, oxygen, or nitrogen, $R^W$ is a methyl radical or phenyl radical, and v is the valence of A minus 1.

The single-site catalyst precursor compound may also be represented by the formula:

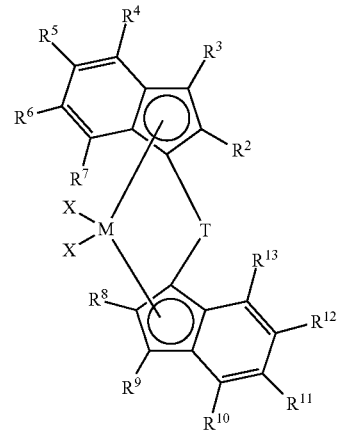

where M is a metal from group 4, 5 or 6; T is a bridging group; each X is, independently, an anionic leaving group; each $R^2$, $R^3$, $R^4$, $R^5$, $R^6$, $R^7$, $R^8$, $R^9$, $R^{10}$, $R^{11}$, $R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR, —OR', —OSiR'$_3$ or —PR'$_2$ radical, wherein R' is one of a halogen atom, a $C_1$-$C_{10}$ alkyl group, or a $C_6$-$C_{10}$ aryl group.

At least one of $R^2$, $R^3$, $R^4$, $R^5$, $R^6$, $R^7$, $R^8$, $R^9$, $R^{10}$, $R^{11}$, $R^{12}$, and $R^{13}$ may be a cyclopropyl substituent represented by the formula:

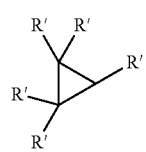

wherein each R' in the cyclopropyls substituent is, independently, hydrogen, a substituted hydrocarbyl group, an unsubstituted hydrocarbyl group, or a halogen.

In a preferred embodiment of the invention, at least one of $R^2$ and $R^8$ has at least four carbon atoms, and preferably at least six carbon atoms.

M may be selected from titanium, zirconium, hafnium, vanadium, niobium, tantalum, chromium, molybdenum and tungsten; each X may be independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and substituted or unsubstituted $C_7$ to $C_{40}$ arylalkenyl groups; or optionally, or joined together to form a $C_4$ to $C_{40}$ alkanediyl group, or a conjugated $C_4$ to $C_{40}$ diene ligand, which is coordinated to M in a metallacyclopentene fashion; or optionally, represent a conjugated diene, optionally, substituted with one or more groups independently selected from hydrocarbyl, trihydrocarbylsilyl, and trihydrocarbylsilylhydrocarbyl groups, said diene having a total of up to 40 atoms not counting hydrogen and forming a π complex with M; each $R^2$, $R^4$, $R^8$ and $R^{10}$ may be independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —NR'$_2$, —SR', —OR', —SiR'$_3$, —OSiR'$_3$, and —PR'$_2$ radicals wherein each R' is independently selected from halogen, substituted or unsubstituted $C_1$ to $C_{10}$ alkyl groups and substituted or unsubstituted $C_6$ to $C_{14}$ aryl groups; $R^3$, $R^5$, $R^6$, $R^7$, $R^9$, $R^{11}$, $R^{12}$, and $R^{13}$ are each selected from the group consisting of hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, and $C_7$ to $C_{40}$ substituted or unsubstituted arylalkenyl groups; and T is selected from:

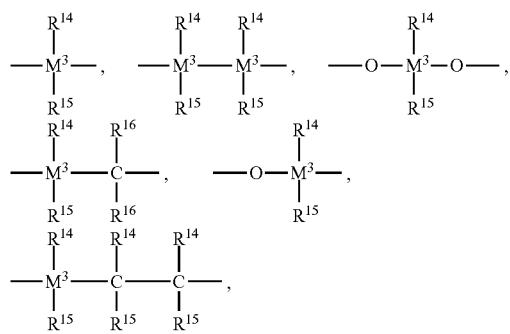

—B($R^{14}$)—, —Al($R^{14}$)—, —Ge—, —Sn—, —O—, —S—, —SO—, —SO$_2$—, —N($R^{14}$)—, —CO—, —P($R^{14}$)—, and —P(O)($R^{14}$)—; wherein $R^{14}$, $R^{15}$, and $R^{16}$ are each independently selected from hydrogen, halogen, $C_1$ to $C_{20}$ alkyl groups, $C_6$ to $C_{30}$ aryl groups, $C_1$ to $C_{20}$ alkoxy groups, $C_2$ to $C_{20}$ alkenyl groups, $C_7$ to $C_{40}$ arylalkyl groups, $C_8$ to $C_{40}$ arylalkenyl groups, and $C_7$ to $C_{40}$ alkylaryl groups, optionally, $R^{14}$ and $R^{15}$, together with the atom(s) connecting them, form a ring; and $M^3$ is selected from carbon, silicon, germanium, and tin; or T is represented by the formula:

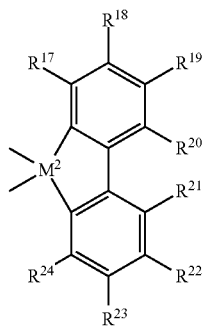

wherein $R^{17}$, $R^{18}$, $R^{19}$, $R^{20}$, $R^{21}$, $R^{22}$, $R^{23}$, and $R^{24}$ are each independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ alkylaryl groups, substituted or unsubstituted $C_7$ to $C_{40}$ alkylaryl groups, and substituted or unsubstituted $C_8$ to $C_{40}$ arylalkenyl groups; optionally two or more adjacent radicals $R^{17}$, $R^{18}$, $R^{19}$, $R^{20}$, $R^{21}$, $R^{22}$, $R^{23}$, and $R^{24}$, including $R^{20}$ and $R^{21}$, together with the atoms connecting them, form one or more rings; and $M^2$ represents one or more carbon atoms, or a silicon, germanium, or tin atom.

In any of the formulas herein, M may be Zr or Hf and/or each X may be, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl group.

In embodiments of the invention, each $R^3$, $R^5$, $R^6$, $R^7$, $R^9$, $R^{11}$, $R^{12}$, or $R^{13}$ is, independently, hydrogen or a substituted hydrocarbyl group or unsubstituted hydrocarbyl group, or a heteroatom, preferably hydrogen, methyl, ethyl, propyl, butyl, pentyl, hexyl, or an isomer thereof.

In embodiments of the invention, each $R^3$, $R^4$, $R^5$, $R^6$, $R^7$, $R^9$, $R^{10}$, $R^{11}$, $R^{12}$, or $R^{13}$ is, independently selected from hydrogen, methyl, ethyl, phenyl, benzyl, cyclobutyl, cyclopentyl, cyclohexyl, naphthyl, anthracenyl, carbazolyl, indolyl, pyrrolyl, cyclopenta[b]thiopheneyl, fluoro, chloro, bromo, iodo, and isomers of propyl, butyl, pentyl, hexyl, heptyl, octyl, nonyl, decyl, methylphenyl, dimethylphenyl, ethylphenyl, diethylphenyl, propylphenyl, dipropylphenyl, butylphenyl, dibutylphenyl, methylbenzyl, methylpyrrolyl, dimethylpyrrolyl, methylindolyl, dimethylindolyl, methylcarbazolyl, dimethylcarbazolyl, methylcyclopenta[b]thiopheneyl dimethylcyclopenta[b]thiopheneyl.

In embodiments of the invention, T is a bridging group and comprises Si, Ge, or C, preferably T is dialkyl silicon or dialkyl germanium, preferably T is dimethyl silicon.

In embodiments of the invention, T is a bridging group and is represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, RB, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR, R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', or R'$_2$C—PR'—CR'$_2$, where each R' is, independently, hydrogen or a $C_1$ to $C_{20}$ containing hydrocarbyl, substituted hydrocarbyl, halocarbyl, substituted halocarbyl, silylcarbyl or germylcarbyl substituent, and optionally, two or more adjacent R' may join to form a substituted or unsubstituted, saturated, partially unsaturated or aromatic, cyclic or polycyclic substituent. Preferably, T is $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p-(Et)_3SiPh)_2C$, cyclopentasilylene ($Si(CH_2)_4$), or $Si(CH_2)_5$.

In embodiments of the invention, $R^2$ and $R^8$ are, independently, a $C_1$ to $C_{20}$ hydrocarbyl, or a $C_1$ to $C_{20}$ substituted hydrocarbyl, $C_1$ to $C_{20}$ halocarbyl, $C_1$ to $C_{20}$ substituted halocarbyl, $C_1$ to $C_{20}$ silylcarbyl, $C_1$ to $C_{20}$ substituted silylcarbyl, $C_1$ to $C_{20}$ germylcarbyl, or $C_1$ to $C_{20}$ substituted germylcarbyl substituents. Preferably, each $R^2$ and $R^8$, is independently, methyl, ethyl, propyl, butyl, pentyl, hexyl, heptyl, octyl, nonyl, decyl, undecyl, dodecyl or an isomer thereof, preferably cyclopropyl, cyclohexyl, (1-cyclohexyl methyl) methyl, isopropyl, and the like.

In embodiments of the invention, $R^4$ and $R^{10}$ are, independently, a substituted or unsubstituted aryl group. Preferred substituted aryl groups include aryl groups where a hydrogen has been replaced by a hydrocarbyl, or a substituted hydrocarbyl, halocarbyl, substituted halocarbyl, silylcarbyl, substituted silylcarbyl, germylcarbyl, or substituted germylcarbyl substituents, a heteroatom or heteroatom containing group.

In embodiments of the invention, $R^2$ and $R^8$ are a $C_1$ to $C_{20}$ hydrocarbyl, such as methyl, ethyl, propyl, butyl, pentyl, hexyl, heptyl, octyl, nonyl, decyl, undecyl, dodecyl or an isomer thereof, preferably cyclopropyl, cyclohexyl, (1-cyclohexyl methyl) methyl, or isopropyl; and $R^4$ and $R^{10}$ are independently selected from phenyl, naphthyl, anthracenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-di-isopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, or cyclopenta[b]thiopheneyl. In a preferred embodiment of the invention, $R^2$, $R^8$, $R^4$ and $R^{10}$ are as described in the preceding sentence and $R^3$, $R^5$, $R^6$, $R^7$, $R^9$, $R^{11}$, $R^{12}$, and $R^{13}$ are hydrogen.

Suitable single-site catalyst precursor compounds may be represented by the formula:

$A_eMX_{n-e}$;

or the formula:

$TA_2MX_{n-2}$;

wherein: e is 1 or 2; T is a bridging group between two A groups; each A is a substituted monocyclic or polycyclic ligand that is pi-bonded to M and optionally includes one or more ring heteroatoms selected from boron, a group 14 atom that is not carbon, a group 15 atom, or a group 16 atom, and when e is 2 each A may be the same or different, provided that at least one A is substituted with at least one cyclopropyl substituent directly bonded to any $sp^2$ carbon atom at a bondable ring position of the ligand, wherein the cyclopropyl substituent is represented by the formula:

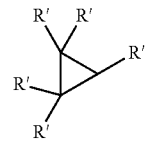

where each R' is, independently, hydrogen, a substituted or unsubstituted hydrocarbyl group, or a halogen; M is a transition metal atom having a coordination number of n and selected from group 3, 4, or 5, or a lanthanide metal atom, or actinide metal atom; n is 3, 4, or 5; and each X is a univalent anionic ligand, or two X's are joined and bound to the metal atom to form a metallocycle ring, or two X's are joined to form a chelating ligand, a diene ligand, or an alkylidene ligand.

The single-site catalyst precursor compound may also be represented by the formula:

$T_y(A)_e(E)MX_{n-e-1}$ where E is $J-R''_{x-1-y}$, J is a heteroatom with a coordination number of three from group 15 or with a coordination number of two from group 16; R" is a $C_1$-$C_{100}$ substituted or unsubstituted hydrocarbyl radical; x is the coordination number of the heteroatom J where "x-1-y" indicates the number of R" substituents bonded to J; T is a bridging group between A and E, A and E are bound to M, y is 0 or 1; and A, e, M, X and n are as defined above.

The single-site catalyst precursor compound may also be represented by one of the following formulas:

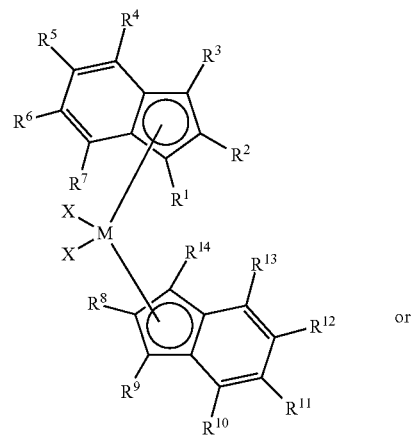

or

-continued

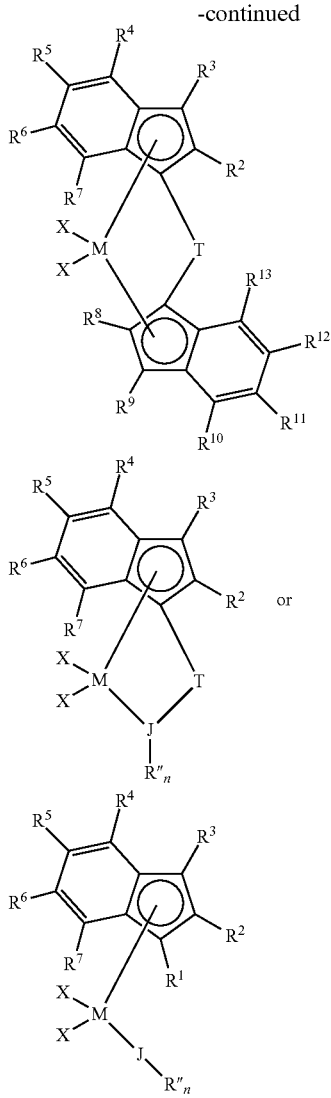

where M, T, X, J, R″, and n are as defined above, and each $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is, independently, hydrogen, a substituted hydrocarbyl group, an unsubstituted hydrocarbyl group, or a halide, provided that in formula 1a and 1b, at least one of $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is a cyclopropyl substituent and in formula 2a and 2b at least one of $R^1$, $R^2$, $R^3$, $R^4$, $R^5$, $R^6$, or $R^7$, is a cyclopropyl substituent; and provided that any adjacent $R^1$ to $R^{14}$ groups that are not a cyclopropyl substituent, may form a fused ring or multicenter fused ring system where the rings may be aromatic, partially saturated, or saturated.

In embodiments of the invention, at least one A is monocyclic ligand selected from the group consisting of substituted or unsubstituted cyclopentadienyl, heterocyclopentadienyl, and heterophenyl ligands provided that when e is one, the monocyclic ligand is substituted with at least one cyclopropyl substituent; at least one A is a polycyclic ligand selected from the group consisting of substituted or unsubstituted indenyl, fluorenyl, cyclopenta[a]naphthyl, cyclopenta[b]naphthyl, heteropentalenyl, heterocyclopentapentalenyl, heteroindenyl, heterofluorenyl, heterocyclopentanaphthyl, heterocyclopentaindenyl, and heterobenzocyclopentaindenyl ligands.

Single-site catalyst compounds suitable for use herein may further include one or more of: dimethylsilylene-bis(2-cyclopropyl-4-phenylindenyl)zirconium dichloride; dimethylsilylene-bis(2-cyclopropyl-4-phenylindenyl)hafnium dichloride; dimethylsilylene-bis(2-methyl-4-phenylindenyl)zirconium dichloride; dimethylsilylene-bis(2-methyl-4-phenylindenyl)hafnium dichloride; dimethylsilylene-bis(2-methyl-4-orthobiphenylindenyl)hafnium dichloride; dimethylsilylene-bis(2-methyl-4-orthobiphenylindenyl)zirconium dichloride; dimethylsilylene-(2-cyclopropyl-4-orthobiphenylindenyl)(2-methyl-4-3',5'-di-t-butylphenylindenyl)hafnium dichloride; dimethylsilylene-(2-cyclopropyl-4-orthobiphenylindenyl) (2-methyl-4-3',5'-di-t-butylphenylindenyl)zirconium dichloride; dimethylsilylene-(2-isopropyl-4(4(4-t-butyl)phenyl)indenyl) (2-methyl-4-phenyl indenyl) zirconium dichloride; dimethylsilylene-(2-isopropyl-4(4-t-butyl)phenyl)indenyl) (2-methyl-4-phenyl indenyl) hafnium dichloride; dimethylsilylene-(2-isopropyl-4(4-t-butyl)phenyl)indenyl) (2-methyl, 4-t-butylindenyl) zirconium dichloride; dimethylsilylene-(2-isopropyl-4(4-t-butyl)phenyl)indenyl) (2-methyl, 4-t-butylindenyl) hafnium dichloride; dimethylsilylene-(2-isopropyl-4(4-t-butyl)phenyl)indenyl) (2-methyl-4-phenylindacenyl) zirconium dichloride; dimethylsilylene-(2-isopropyl-4(4-t-butyl)phenyl)indenyl) (2-methyl-4-phenylindacenyl) hafnium dichloride; dimethylsilylene (4-o-Biphenyl-2-(1-methylcyclohexyl)methyl-indenyl) (4-(3,5-di-tert-butylphenyl)-2-methyl-indenyl) zirconium dichloride; and dimethylsilylene (4-o-Biphenyl-2-(1-methylcyclohexyl)methyl-indenyl) (4-(3,5-di-tert-butylphenyl)-2-methyl-indenyl) hafnium dichloride; where, in alternate embodiments, the dichloride in any of the compounds listed above may be replaced with dialkyl (such as dimethyl), dialkaryl, diflouride, diiodide, or dibromide, or a combination thereof.

The single-site catalyst precursor compound may also be represented by the formula (I):

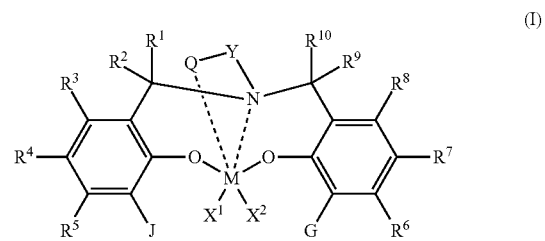

wherein M is a group 4 transition metal (preferably Hf, Zr, or Ti, preferably Hf or Zr);

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure (preferably benzyl, methyl, ethyl, chloro, bromo and the like);

each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a substituted $C_1$ to $C_{40}$ hydrocarbyl radical, a heteroatom, a heteroatom-containing group (alternately each $R^1$, $R^2$, $R^3$, $R^4$, $R^5$, $R^6$, $R^7$, $R^8$, $R^9$, and $R^{10}$ may be a functional group comprising of elements from groups 13 to 17), or two or more of $R^1$ to $R^{10}$ may independently join together to form a $C_4$ to $C_{62}$ cyclic or polycyclic ring structure, or a combination thereof (preferably H, methyl, ethyl, propyl and the like);

Q is a neutral donor group, preferably a neutral donor group comprising at least one atom from group 15 or 16;

J is a $C_7$ to $C_{60}$ fused polycyclic (e.g., having at least 2 ring structures) group, which, optionally, comprises up to 20 atoms from groups 15 and 16, where at least one ring is aromatic and where at least one ring, which may or may not be aromatic, has at least 5 members (preferably J comprises a five-membered ring (which may be saturated or aromatic) that is fused to at least one other cyclic group and is preferably bound to the rest of the ligand through the five-membered ring);

G is, independently, as defined for J, a hydrogen, a $C_1$ to $C_{60}$ hydrocarbyl radical, a substituted hydrocarbyl radical, a heteroatom, or a heteroatom-containing group, or may independently form a $C_4$ to $C_{60}$ cyclic or polycyclic ring structure with $R^6$, $R^7$, or $R^8$ or a combination thereof; and Y is a divalent $C_1$ to $C_{20}$ hydrocarbyl or a substituted divalent hydrocarbyl group.

In particular embodiments, the catalyst compound may be represented by either formula (II) or (III) below:

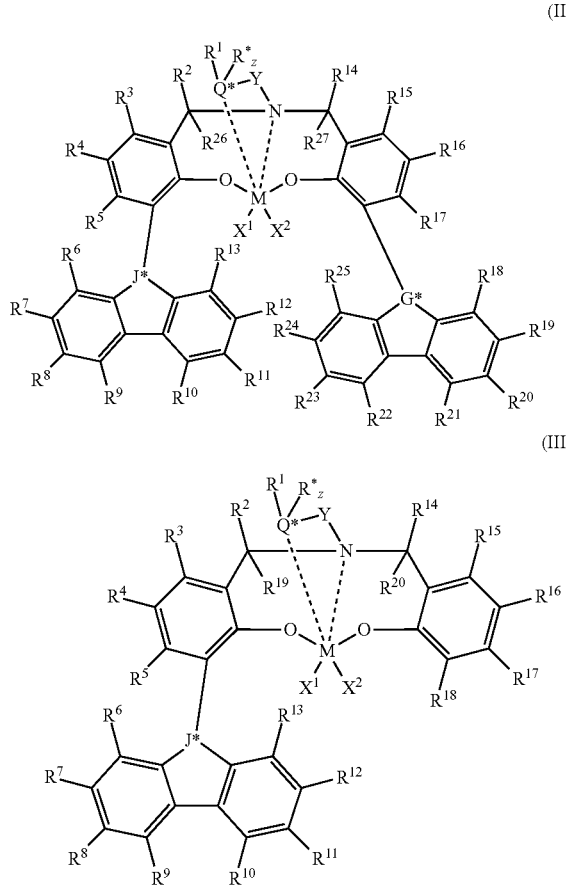

wherein M, $X^1$, $X^2$, $R^1$, $R^2$, $R^3$, $R^4$, $R^5$, $R^6$, $R^7$, $R^8$, $R^9$, $R^{10}$, and Y are as defined above with respect to formula (I);

Q* is a group 15 or 16 atom (preferably N, O, S, or P);

z is 0 or 1;

J* is CR" or N;

G* is CR" or N; and each R", R*, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, as defined for $R^1$ above with respect to formula (I).

In any embodiment of the transition metal complexes described herein, M may be Hf, Ti, or Zr.

In any embodiment of formulas (I), (II), and (III) described herein, each of $X^1$ and $X^2$ is independently selected from the group consisting of hydrocarbyl radicals having from 1 to 20 carbon atoms (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl), hydrides, amides, alkoxides having from 1 to 20 carbon atoms, sulfides, phosphides, halides, sulfoxides, sulfonates, phosphonates, nitrates, carboxylates, carbonates and combinations thereof, preferably each of $X^1$ and $X^2$ is independently selected from the group consisting of halides (F, Cl, Br, I), alkyl radicals having from 1 to 7 carbon atoms (methyl, ethyl, propyl, butyl, pentyl, hexyl, heptyl, and isomers thereof), benzyl radicals, or a combination thereof.

In any embodiment of formulas (I), (II), and (III) described herein Y is a divalent $C_1$ to $C_{40}$ hydrocarbyl radical or divalent substituted hydrocarbyl radical comprising a portion that comprises a linker backbone comprising from 1 to 18 carbon atoms linking or bridging between Q and N. In an embodiment, Y is a divalent $C_1$ to $C_{40}$ hydrocarbyl or substituted hydrocarbyl radical comprising a portion that comprises a linker backbone comprising from 1 to 18 carbon atoms linking Q and N wherein the hydrocarbyl comprises O, S, S(O), S(O)$_2$, Si(R')$_2$, P(R'), N or N(R'), wherein each R' is independently a $C_1$ to $C_{18}$ hydrocarbyl. In an embodiment, Y is selected from the group consisting of ethylene (—CH$_2$CH$_2$—) and 1,2-cyclohexylene. In an embodiment, Y is —CH$_2$CH$_2$CH$_2$— derived from propylene. In an embodiment, Y is selected form the group consisting of $C_1$ to $C_{20}$ alkyl groups, such as divalent methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl.

In a particular embodiment of formulas (I), (II), and (III), each $R^1$, $R^2$, $R^3$, $R^4$, $R^5$, $R^6$, $R^7$, $R^8$, $R^9$, and $R^{10}$ is, independently, a hydrogen, a $C_1$ to $C_{20}$ hydrocarbyl radical, a substituted $C_1$ to $C_{20}$ hydrocarbyl radical, or two or more of $R^1$ to $R^{10}$ may independently join together to form a $C_4$ to $C_{62}$ cyclic or polycyclic ring structure, or a combination thereof.

In any embodiment of formulas (I), (II), and (III) described herein, each R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, hydrogen, a halogen, a $C_1$ to $C_{30}$ hydrocarbyl radical, a $C_1$ to $C_{20}$ hydrocarbyl radical, or a $C_1$ to $C_{10}$ hydrocarbyl radical (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl).

In any embodiment of formulas (I), (II), and (III) described herein, each R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, a substituted $C_1$ to $C_{30}$ hydrocarbyl radical, a substituted $C_1$ to $C_{20}$ hydrocarbyl radical, or a substituted $C_1$ to $C_{10}$ hydrocarbyl radical (such as 4-fluorophenyl, 4-chlorophenyl, 4-bromophenyl, 4-methoxyphenyl, 4-trifluoromethylphenyl, 4-dimethylaminophenyl, 4-trimethylsilylphenyl, 4-triethylsilylphenyl, trifluoromethyl, fluoromethyl, trichloromethyl, chloromethyl, mesityl, methylthio, phenylthio, (trimethylsilyl)methyl, and (triphenylsilyl)methyl).

In an embodiment of formulas (I), (II), and (III) described herein, one or more of R*, R'', R$^1$, R$^2$, R$^3$, R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, and R$^{27}$ is a methyl radical, a fluoride, chloride, bromide, iodide, methoxy, ethoxy, isopropoxy, trifluoromethyl, dimethylamino, diphenylamino, adamantyl, phenyl, pentafluorphenyl, naphthyl, anthracenyl, dimethylphosphanyl, diisopropylphosphanyl, diphenylphosphanyl, methylthio, and phenylthio or a combination thereof.

In any embodiment of formulas (I), (II), and (III) described herein, Q* is N, O, S, or P, preferably N, O, or S, preferably N or O, preferably N. In any embodiment of the transition metal complexes described herein when Q* is a group 15 atom, z is 1, and when Q* is a group 16 atom, z is 0.

In any embodiment of formulas (I), (II), and (III) described herein, Q is preferably a neutral donor group comprising at least one atom from group 15 or 16, preferably Q is NR'$_2$, OR, SR', PR'$_2$, where R is as defined for R$^1$ (preferably R' is methyl, ethyl, propyl, isopropyl, phenyl, cyclohexyl or linked together to form a five-membered ring such as pyrrolidinyl or a six-membered ring such as piperidinyl), preferably the -(-Q-Y—)— fragment can form a substituted or unsubstituted heterocycle which may or may not be aromatic and may have multiple fused rings (for example see compound 7-Zr, 7-Hf in the examples below). In any embodiment of formulas (I), (II), and (III) described herein, Q is preferably an amine, ether, or pyridine.

In a particular embodiment of formulas (I), (II), and (III) described herein, G* and J* are the same, preferably G* and J* are N, alternately G* and J* are CR''', where each R''' is H or a C$_1$ to C$_{12}$ hydrocarbyl or substituted hydrocarbyl (such as methyl, ethyl, ethenyl and isomers of propyl, butyl, pentyl, hexyl, heptyl, octyl, nonyl, decyl, undecyl, dodecyl, trifluoromethylphenyl, tolyl, phenyl, methoxyphenyl, tert-butylphenyl, fluorophenyl, diphenyl, dimethylaminophenyl, chlorophenyl, bromophenyl, iodophenyl, (trimethylsilyl) phenyl, (triethylsilyl)phenyl, (triethylsilyl)methyl, (triethylsilyl)methyl). In a useful embodiment of formulas (I), (II), and (III) described herein, G* and J* are different.

In a particular embodiment of formulas (I), (II), and (III) described herein, G and J are the same, preferably G and J are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, or substituted fluorenyl. In a useful embodiment of formulas (I), (II), and (III) described herein, G and J are different.

In an embodiment of formulas (I), (II), and (III) described herein, M is Zr or Hf; X$^1$ and X$^2$ are benzyl radicals; R$^1$ is a methyl radical; R$^2$ through R$^{27}$ are hydrogen; Y is ethylene (—CH$_2$CH$_2$—), Q*, G* and J* are N, and Rz* is methyl radical.

In an embodiment of formulas (I), (II), and (III) described herein, M is Zr or Hf; X$^1$ and X$^2$ are benzyl radicals; R$^4$ and R$^7$ are methyl radicals; R$^1$ through R$^3$, R$^5$ through R$^6$ and R$^8$ through R$^{10}$ are hydrogen; and Y is ethylene, (—CH$_2$CH$_2$—), Q is an N-containing group, G and J are carbazolyl or fluorenyl. In a preferred combination, G and J are carbazolyl and Q is an amine group; or, G and J are substituted fluorenyl and Q is an amine, ether or pyridine.

The catalyst compound may also be represented by either formulas (IV) and (V) below:

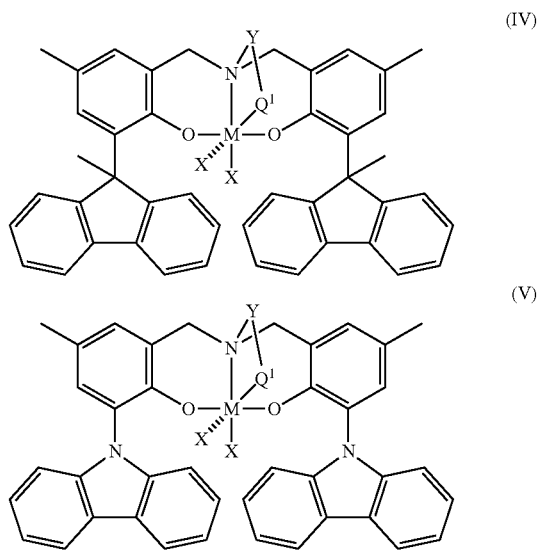

where Y is a C$_1$ to C$_3$ divalent hydrocarbyl, Q$^1$ is NR'$_2$, OR', SR', PR'$_2$, where R' is as defined for R$^1$ with respect to formulas (I), (II), and (III) above (preferably R' is methyl, ethyl, propyl, isopropyl, phenyl, cyclohexyl or linked together to form a five-membered ring such as pyrrolidinyl or a six-membered ring such as piperidinyl), alternately the -(-Q-Y—)— fragment can form a substituted or unsubstituted heterocycle which may or may not be aromatic and may have multiple fused rings, M is Zr, Hf or Ti and each X is, independently, as defined for X$^1$ above with respect to formulas (I), (II), and (III), preferably each X is benzyl, methyl, ethyl, chloride, bromide or alkoxide.

Monomers: Monomers useful herein include substituted or unsubstituted C$_2$ to C$_{40}$ alpha olefins, C$_2$ to C$_{20}$ alpha olefins, C$_2$ to C$_{12}$ alpha olefins, preferably ethylene, propylene, butene, pentene, hexene, heptene, octene, nonene, decene, undecene, dodecene, and isomers thereof. In a preferred embodiment, the monomer comprises propylene and the comonomer comprises one or more of ethylene or C$_4$ to C$_{40}$ olefins, C$_4$ to C$_{20}$ olefins, or C$_6$ to C$_{12}$ olefins. In another preferred embodiment, the monomer comprises ethylene and the comonomer comprises one or more of propylene or C$_4$ to C$_{40}$ olefins, C$_4$ to C$_{20}$ olefins, or C$_6$ to C$_{12}$ olefins. The C$_4$ to C$_{40}$ olefin monomers may be linear, branched, or cyclic. The C$_4$ to C$_{40}$ cyclic olefins may be strained or unstrained, monocyclic or polycyclic, and may optionally include heteroatoms and/or one or more functional groups.

Exemplary C$_2$ to C$_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

One or more dienes may be present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, 400 ppm or less, or 300 ppm or less. In other embodiments, at least 50 ppm of diene is added to the polymerization, or 100 ppm or more, or 150 ppm or more.

Diolefins useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). The diolefins may be selected from alpha, omega-diene monomers (i.e., di-vinyl monomers). The diolefins may be linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

The polymerization or copolymerization may be carried out using olefins such as ethylene, propylene, 1-butene, 1-hexene, 4-methyl-l-pentene, and 1-octene, vinylcyclohexane, norbornene and norbornadiene. In particular, propylene and ethylene are polymerized.

One or more stages of the polymerization may be carried out using a single monomer with no comonomer. For example, the single monomer used to produce the matrix phase may be ethylene, and the resulting matrix phase may comprise polyethylene homopolymer. Likewise, the single monomer used to produce the matrix phase may be propylene, and the resulting matrix phase may comprise polypropylene, such as syndiotactic polypropylene (sPP). Where a comonomer is not used to produce the matrix phase, comonomer may be added to the reactor to produce the fill phase.

Sequential Polymerization: The heterophasic polymers may be prepared using polymerization processes such as a two-stage process in two reactors or a three-stage process in three reactors. It is also possible to produce these copolymers in a single reactor. Each stage may be independently carried out in either the slurry or gas phase. For example, a first stage may be conducted in a gas phase fluidized bed reactor and a second in single tank autoclave reactor or a loop reactor operating in slurry phase, or vice versa. An optional third stage may also be in slurry or gas phase.

Slurry and gas phase polymerization processes are known in the art. As used herein, slurry polymerization processes are processes that utilize a supported catalyst and where at least 95 wt % of the polymer product derived from the supported catalyst is in granular form as solid particles upon exiting the reactor (not dissolved in the diluent). Gas phase polymerization processes are processes where the reactor is typically a fluidized bed comprising monomer and comonomer primarily in the gas phase and fluidized granular solid particles comprising catalyst components and polymer. Gas phase polymerization processes useful herein may be operated in either dry or condensed mode.

The heterophasic polymers can be produced in multiple reactors operated in series where, for example, the matrix phase is polymerized first in a gas phase or slurry polymerization process. The fill phase is then polymerized in the presence of the matrix phase in a second gas phase or slurry reactor, or in the same reactor. Additionally, the matrix phase or the fill phase could itself be made in at least two reactors in order to obtain fractions with different properties, e.g., varying molecular weights, composition distributions, polydispersities, melt flow rates, or the like. The copolymers may be produced in any order or in the same reactor and/or series of reactors. If two or more reactors or reaction stages are used, preferably they are combined so as to form a continuous process.

The processes may also be carried out in a single gas phase fluidized bed reactor or a single tank autoclave or loop reactor operating in slurry mode. Additionally, the contacting of monomer and comonomer under polymerization conditions comprising a first molar ratio of monomer to comonomer may be carried out in a first reactor, and the adjusting of the polymerization conditions to comprise a second molar ratio of monomer to comonomer may be carried out in a second reactor. The first and second reactors may be at least one gas phase fluidized bed reactor, at least one single tank autoclave reactor or at least one loop reactor operating in slurry mode, or any combination thereof. The gas phase fluidized bed reactor(s), when used, may be operated in condensed or dry mode.

In preferred embodiments of the invention, no solvent or diluent is present or added in the reaction medium except for the small amounts used as the carrier for the catalyst system or other additives, or amounts typically found with the monomer; e.g., propane in propylene as is known in the art. The feed concentration of the monomers and comonomers for the polymerization may be 60 vol % solvent or less, 40 vol % or less, 20 vol % or less, 10 vol % or less, or 5 vol % or less, based on the total volume of the monomer and comonomer feedstreams.

Polymerizations can be run at any temperature and/or pressure suitable to obtain the desired polymers. Typical temperatures and/or pressures in any stage include a temperature greater than 30° C., greater than 50° C., greater than 65° C., greater than 70° C., or greater than 75° C., and less than 300° C., less than 200° C., less than 135° C., less than 120° C., or less than 115° C.; and/or pressures of less than 20 MPa, 10 MPa, 7 MPa, 5 MPa, or 2 MPa. Gas and slurry phase polymerization processes generally operate at lower temperatures. Thus, in preferred embodiments of the invention, the polymerization conditions comprise a temperature of from about 10° C. to less than 135° C., 130° C., 125° C., 120° C., or 115° C. Polymerization in any stage may include a reaction run time up to 300 minutes, or in the range of from about 5 to 250 minutes, or from about 10 to 120 minutes. In embodiments of the invention, in a continuous process the polymerization time for all stages is from 1 to 600 minutes, or 5 to 300 minutes, or from about 10 to 120 minutes.

Hydrogen and/or other CTA's may be added to one, two, or more reactors or reaction zones to control Mw and melt flow rate (MFR) of the polymer produced. When used, hydrogen may be present in the polymerization reaction zone at a partial pressure of from 0.001 to 100 psig (0.007 to 690 kPa), or from 0.001 to 50 psig (0.007 to 345 kPa), or from 0.01 to 25 psig (0.07 to 172 kPa), or 0.1 to 10 psig (0.7 to 70 kPa). Hydrogen may be added to the first reactor, a second, or third, or subsequent reactor, or any combination thereof. Likewise, in a three stage process hydrogen may be added to the first stage, and/or the second stage, and/or the third stage. In embodiments of the invention, hydrogen is added in a higher concentration to the second stage as compared to the first stage. Alternatively, hydrogen may be added in a higher concentration to the first stage as compared to the second stage.

In preferred embodiments of the invention, the processes involve contacting a monomer and comonomer in a gas or slurry phase reactor with a catalyst system under polymerization conditions comprising a first molar ratio of monomer to comonomer to produce a porous matrix phase, and then adjusting, in the presence of the matrix phase, the polymerization conditions to a second molar ratio of monomer to comonomer to produce a fill phase at least partially filling pores of the matrix phase. The first molar ratio of monomer to comonomer may be at least 90:10 to 99.9:0.1, including any subrange within this range. The second ratio of monomer to comonomer may be from 90:10 to 10:90, 80:20 to 20:80, 70:30 to 30:70, 60:40 to 40:60, including any subrange within this range and any combination of any upper and lower values for these ratios.

Comonomer incorporation can be controlled in various ways. For example, catalyst precursors having high molecular weight polymer generating capabilities generally contribute to higher comonomer incorporation in the matrix phase. Lower polymerization temperatures can also be used to increase comonomer incorporation. Likewise, use of a more porous support, having a larger average particle size and/or a narrower particle size distribution, can increase comonomer incorporation. The matrix phase produced herein can have higher comonomer incorporation than those derived from conventional supported catalyst systems such as Zielger-Natta or MCN catalysts supported on lower surface area supports.

Other additives may also be used in the polymerization in any stage, as desired, such as one or more scavengers, promoters, modifiers, hydrogen, CTAs other than or in addition to hydrogen (such as diethyl zinc), reducing agents, oxidizing agents, aluminum alkyls, or silanes, or the like. In an embodiment of the invention, little or no scavenger is used in the polymerization in any stage to produce the polymer, i.e., scavenger (such as trialkyl aluminum) is present at a molar ratio of scavenger metal to transition metal of 0:1, alternately less than 100:1, or less than 50:1, or less than 15:1, or less than 10:1, or less than 1:1, or less than 0.1:1.

The reactor effluent in the processes disclosed herein comprises a granular heterophasic polymer. In other words, the heterophasic polymer is in solid, granular form in the reactor effluent that is withdrawn directly from the reactor. Gas and slurry phase polymerization processes are capable of producing reactor effluents comprising solid, granular polymers. In gas phase processes, the reactor effluent comprises solid, granular polymer without any substantial amount of solvent. In slurry phase polymerization processes, the reactor effluent typically comprises solid, granular polymer in a solvent-based slurry. In solution phase polymerization processes, on the other hand, the reactor effluent is a liquid comprising polymer in liquid form and a substantial amount of solvent that must be separated out in post-reactor separation processes.

In an embodiment of the invention, the productivity of the catalyst system in a single stage or in all stages combined is at least 50 g(polymer)/g(cat)/hour, preferably 500 or more g(polymer)/g(cat)/hour, preferably 800 or more g(polymer)/g(cat)/hour, preferably 5000 or more g(polymer)/g(cat)/hour, preferably 7500 or more g(polymer)/g(cat)/hour. In an embodiment of the invention, the activity of the catalyst system in a single stage or in all stages combined is at least 50 kg P/mol cat, preferably 500 or more kg P/mol cat, preferably 5000 or more kg P/mol cat, preferably 7500 or more kg P/mol cat.

Polymer Products: The processes described herein can produce a variety of polymer products, including but not limited to heterophasic ethylene and propylene copolymers comprising bimodal rubbers, RCPs, and plastomers. The heterophasic polymers comprise a porous matrix phase and a fill phase at least partially filling pores in the matrix phase. The heterophasic polymers may have a bimodal composition distribution in a GPC-IR trace and/or a bimodal molecular weight distribution.

The matrix phase comprises at least 90 mol % monomer and from 0 to 10 mol % comonomer, or from 0.1 to 10 mol % comonomer, based on the total moles of monomer and comonomer in the matrix phase. In preferred embodiments of the invention, the monomer is ethylene and the comonomer is propylene, or the monomer is propylene and the comonomer is ethylene. In preferred embodiments of the invention, the matrix phase comprises at least 90 mol %, 92 mol %, 94 mol %, 96 mol %, 98 mol %, or 100 mol % of the monomer and from 0 or 0.1 to 6 mol %, 0 or 0.1 to 8 mol %, or 0 or 0.1 to 10 mol % of the comonomer, based on the total moles of monomer and comonomer in the matrix phase. In preferred embodiments of the invention, the matrix phase is a stiff propylene-based random copolymer with 0.1 to 10 mol %, 0.1 to 8 mol %, or 0.1 to 6 mol % of ethylene. In other embodiments of the invention, a single monomer is used to produce the matrix phase, and the matrix phase comprises polyethylene homopolymer or sPP.

The matrix phase may be further characterized by a porosity, as determined by mercury intrusion porosimetry, of at least 20%, 30% or 40% or more. It may also be further characterized by a random statistical distribution of monomer units, meaning that the probability of finding a given type of monomer residue at a particular point in the polymer chain is about equal to the mole fraction of that monomer residue in the chain. It may have a composition distribution breadth index of 50% or more, 60% or more, or 70% or more. The matrix phase may also have a bimodal molecular weight distribution.

The fill phase at least partially fills the pores of the matrix phase. The fill phase may be an amorphous rubber or a plastomer that may be sticky at RT and/or sticky at elevated temperatures of 60-90° C. The monomer to comonomer molar ratio in the fill phase is from 80:20 to 20:80. For example, the fill phase may comprise from at least 20 mol %, 30 mol %, 40 mol %, 50 mol %, 60 mol %, 70 mol %, or 80 mol % of monomer and at or less than 80 mol %, 70 mol %, 60 mol %, 50 mol %, 40 mol %, 30 mol %, or 20 mol % comonomer, based on the total weight of monomer and comonomer in the fill phase. In embodiments of the invention, the fill phase comprises one or more of an amorphous ethylene propylene rubber, a plastomer, an RCP, or EPDM. The fill phase may be from 12 to 90 wt % of the heterophasic copolymer, including any subrange within this range, based on the total weight of the matrix and fill phases.

Dusting powers are sometimes used with sticky polymer compositions to prevent sticking or agglomeration of polymer particles and enhance flowability, and may be used with the polymer compositions produced herein. As used herein, a "dusting powder" is any substance applied to a polymer composition to prevent sticking or agglomeration or enhance flowability. The compositions described herein may be formed into particles, granules, pellets, or other forms and then dusted with a dusting powder. Suitable dusting powders include polyolefin powders, and preferably microfine polyolefin powders. The powders are often used at 0.01 to 10 wt %, 0.1 to 5 wt %, or 0.1 to 1 wt %, based on the weight the polymer composition. Suitable dusting powders include polyethylene (including but not limited to LDPE, LLDPE, MDPE, and HDPE), polypropylene, or ethylene vinyl acetate copolymers. A preferred dusting powder is made from polyethylene having a density of 0.91 to 0.96 g/cc or 0.915 to 0.925 g/cc and an MI of 1 to 100 dg/min or 5 to 50 dg/min. Dusting powders may have a mesh size of from 1 to 100, 5 to 100, or 10 to 70 and a median diameter of 5 to 2000 micron, 10 to 500 micron, 10 to 100 micron, or 15 to 25 micron. Useful polyolefin powders are available from Equistar Chemicals LP under the tradename MICROTHENE, including MICROTHENE F grades and MICROTHENE G grades, such as FN510, FN532, FA700, and FP-800. A particularly preferred microfine dusting powder is MICROTHENE FA709-00, which is a high density polyethylene powder (0.952 g/cc) having a reported MI of 10 dg/min, a reported melting point of 134° C., and an average particle size of 20 microns.

In preferred embodiments of the invention, the heterophasic polymer compositions in granular or pelletized form are free-flowing, preferably without the use of dusting powder, which can be demonstrated or measured in several different ways as further explained below. The heterophasic polymers may be free-flowing in the sense that no dusting powder is used or required for them to flow and not agglomerate, even after storage for a significant length of time. Thus, in preferred embodiments of the invention, the heterophasic polymers are free-flowing in that after storage at RT for at least four months, they have a particle size distribution characterized by less than 4.0 wt %, 3.0 wt %, 2.0 wt %, 1.5 wt %, 1.0 wt %, or 0.5 wt % of particles having a diameter of more than 4000 µm, based on the total wt % of particles in the heterophasic polymer, and preferably without the application of any dusting powder. In preferred embodiments of the invention, the heterophasic polymers (e.g., ethylene-propylene copolymers) are free-flowing in that they comprise from 3 to 30 mol % ethylene, based on the total moles of polymer in the heterophasic polymer and, after storage at RT for at least four months, have a particle size distribution characterized by less than 4.0 wt %, 3.0 wt %, 2.0 wt %, 1.5 wt %, 1.0 wt %, or 0.5 wt % of particles having a diameter of more than 4000 µm, based on the total wt % of particles in the heterophasic polymer, and preferably without the application of any dusting powder. In preferred embodiments of the invention, the heterophasic polymers (e.g., ethylene-propylene copolymers) are free-flowing in that they comprise more than 30 mol % ethylene, based on the total moles of polymer in the heterophasic polymer and, after storage at RT for at least four months, have a particle size distribution characterized by less than 10 wt %, 5 wt %, 3 wt %, 2. 0 wt %, 1.5 wt %, 1.0 wt %, or 0.5 wt % of particles having a diameter of more than 4000 µm, based on the total wt % of particles in the heterophasic polymer, and preferably without the application of any dusting powder.

In preferred embodiments of the invention, the heterophasic polymers in granular or pelletized form are free-flowing according to a flowability test. This test is designed to simulate both the internal geometry of a bulk rail car as well as a storage silo. Both geometries are simulated in a device that has a circular cross section and has an angled bottom. In this test, a cylindrical device would be used, (referred to as a test silo) which would have a cylindrical inner cavity having a 30 cm total length axially along a central axis, and 9 cm internal diameter radially disposed about that central axis. The cylinder inner cavity would be bound on a bottom side by a narrowing (frusta-conical) constriction radially disposed about the central axis to a diameter of 3 cm, and having an angle of 30° to the central axis. Approximately 500 g of particles or pellets would be placed in the test silo with the bottom covered with a bottom stopper. The test silo would then be placed in an oven for 3 days at a predefined temperature, typically about 43° C. The test silo would then be removed from the oven, the bottom stopper would be removed, and the time required for the test silo to empty of the pellets would be recorded. If the pellets empty in less than 5 minutes, the pellets would be considered free-flowing. If the pellets do not empty in less than 5 minutes (300 seconds), the test would be discontinued and the pellets adjudged not to be free-flowing.

In preferred embodiments of the invention, the heterophasic polymers in granular or pelletized form are free-flowing according to a funnel test. The funnel test is conducted according to ASTM D1895 Method B, but modified to use a funnel having a 29 mm bottom opening as described further below. In particular, the test apparatus consisted of a funnel with removable bottom seal and a receiving bin. The funnel had a top inner diameter of 73 mm, with a bottom opening of 29 mm The length of the cone-shape portion of the funnel was 50 mm (ASTM D1895 Test Method B calls for a funnel having a 127 mm top inner diameter and a 25.4 mm bottom inner diameter with a frustoconical shape radially disposed about a central axis and extending 230 mm from the top to the bottom.) The testing procedure herein was as follows. First, the funnel was loaded with about 500 grams of particles. Then the bottom seal of the funnel was removed and simultaneously a timer was started. The timer was stopped when all of the pellets have flowed out of the funnel, and the time was recorded.

Preferably, the copolymers are free-flowing both initially and after elevated temperature storage (e.g., storage at 120° F. for 7 days). For example, an initial pourability value prior to aging or storage of the particles of the present invention may be about 120 seconds or less, when determined according to ASTM D1895 Method B, modified to use a funnel having a 29 mm bottom opening. Preferably, the pourability value is about 60 seconds or less, about 30 seconds or less, about 10 seconds or less, about 5 seconds or less, or about 2 seconds or less, when determined according to ASTM D1895 Method B, modified to use a funnel having a 29 mm bottom opening. After aging of the particles at 120° F. for 7 days, the aged pourability value of the particles of the present invention may be about 300 seconds or less, when determined according to ASTM D1895 Method B, modified to use a funnel having a 29 mm bottom opening. Preferably, after aging the pourability value is about 200 seconds or less, about 100 seconds or less, about 50 seconds or less, about 30 seconds or less, or about 10 seconds or less, when determined according to ASTM D1895 Method B, modified to use a funnel having a 29 mm bottom opening.

The polymer produced herein may be combined with one or more additional polymers prior to being formed into a film, molded part, or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene. Additionally, additives may be included in the blend, in one or more components of the blend, and/or in a product formed from the blend, such as a film, as desired.

Experimental

All reactions were carried out under a purified nitrogen atmosphere using standard glovebox, high vacuum or Schlenk techniques, in a CELSTIR reactor unless otherwise noted. All solvents used were anhydrous, de-oxygenated and purified according to known procedures. All starting materials were either purchased from Aldrich and purified prior to use or prepared according to procedures known to those skilled in the art. Silica was obtained from PQ Corporation (PD 13054 and 14024) and AGC Chemicals Americas, Inc. (D150-60A, D100-100A, and D70-120A). MAO was obtained as a 30 wt % MAO in toluene solution from Albemarle (e.g., 13.6 wt % Al or 5.04 mmol/g). Deuterated solvents were obtained from Cambridge Isotope Laboratories (Andover, Mass.) and dried over 3Å molecular sieves. All $^1$H NMR data were collected on a Broker AVANCE III 400 MHz spectrometer running Topspin™ 3.0 software at room temperature (RT) using tetrachloroethane-d$_2$ as a solvent (chemical shift of 5.98 ppm was used as a reference) for all materials.

Slurry and solvent liquid ratios are given as weight ratios relative to the starting silica material, e.g., raw silica or silica supported MAO and/or catalyst. For example, if it is stated "the silica was slurried in 5× toluene," it means that the silica was slurried in 5 g of toluene for every 1 g of silica.

Molecular Weight and Comonomer Composition with PolymerChar GPC-IR (GPC-4D): The distribution and the moments of molecular weight (Mw, Mn, Mw/Mn, etc.) and the comonomer content were determined with high temperature Gel Permeation Chromatography (PolymerChar GPC-IR) equipped with a multiple-channel band filter based Infrared detector ensemble IR5, in which a broad-band channel was used to measure the polymer concentration while two narrow-band channels were used for characterizing composition. Three Agilent PLgel 10 µm Mixed-B LS columns were used to provide polymer separation. Aldrich reagent grade 1,2,4-trichlorobenzene (TCB) with 300 ppm antioxidant butylated hydroxytoluene (BHT) was used as the mobile phase. The TCB mixture was filtered through a 0.1 µm Teflon filter and degassed with an online degasser before entering the GPC-IR instrument. The nominal flow rate was 1.0 mL/min and the nominal injection volume was 200 µL. The whole system including transfer lines, columns, and detectors were contained in an oven maintained at 145° C. A given amount of polymer sample was weighed and sealed in a standard vial with 80 µL of flow marker (heptane) added to it. After loading the vial in the autosampler, polymer was automatically dissolved in the instrument with 8 mL of added TCB solvent. The polymer was dissolved at 160° C. with continuous shaking, generally for about 1 hour for polyethylene (PE) samples or 2 hours for polypropylene (PP) samples. The TCB densities used in the concentration calculation were 1.463 g/ml at RT and 1.284 g/ml at 145° C. The sample solution concentration was from 0.2 to 2.0 mg/ml, with lower concentrations being used for higher molecular weight samples.

The concentration, c, at each point in the chromatogram was calculated from the baseline-subtracted IR5 broadband signal, I, using the following equation:

$$c = \alpha I$$

where α is the mass constant determined with PE or PP standards. The mass recovery was calculated from the ratio of the integrated area of the concentration chromatography over elution volume and the injection mass, which is equal to the pre-determined concentration multiplied by injection loop volume.

The molecular weight was determined by combining a universal calibration relationship with the column calibration which was performed with a series of monodispersed polystyrene (PS) standards. The MW was calculated at each elution volume with following equation:

$$\log M_X = \frac{\log(K_{PS}/K_X)}{a_X + 1} + \frac{a_{PS} + 1}{a_X + 1} \log M_{PS}$$

where the variables with subscript "X" stand for the test sample while those with subscript "PS" stand for PS. In this method, $a_{PS}=0.67$ and $K_{PS}=0.000175$ while $a_X$ and $K_X$ were obtained from published literature. Specifically, a/K=0.695/0.000579 for PE and 0.705/0.0002288 for PP.

The comonomer composition was determined by the ratio of the IR detector intensity corresponding to CH$_2$ and CH$_3$ channel calibrated with a series of PE and PP homo/copolymer standards whose nominal value are predetermined by NMR or FTIR.

Melt Flow Rate (MFR): MFR was measured as per ASTM D1238, condition L, at 230° C. and 2.16 kg load unless otherwise indicated.

Differential Scanning calorimetry (DSC): Peak crystallization temperature (T$_c$), peak melting temperature (T$_m$), heat of fusion (H$_f$) and glass transition temperature (Tg) are measured via differential scanning calorimetry (DSC) using a DSCQ200 unit. The sample is first equilibrated at 25° C. and subsequently heated to 220° C. using a heating rate of 10° C./min (first heat). The sample is held at 220° C. for 3 min. The sample is subsequently cooled down to −100° C. with a constant cooling rate of 10° C./min (first cool). The sample is equilibrated at −100° C. before being heated to 220° C. at a constant heating rate of 10° C./min (second heat). The exothermic peak of crystallization (first cool) is analyzed using the TA Universal Analysis software and the corresponding to 10° C./min cooling rate is determined. The endothermic peak of melting (second heat) is also analyzed using the TA Universal Analysis software and T$_m$ corresponding to 10° C./min heating rate is determined. Areas under the DSC curve are used to determine H$_f$ upon melting or H$_c$, upon crystallization, and Tg.

Mercury Intrusion Porosimetry: Mercury intrusion porosimetry was used to determine the porosity and the median PD of the porous matrix phases using an Autopore IV 9500 series mercury porosimeter, and unless indicated otherwise, an average Hg contact angle of 130.000°, an Hg surface tension of 485.000 dynes/cm, an evacuation pressure of 50 µm Hg, and an Hg filling pressure of 3.65 kPa (0.53 psia) unless otherwise indicated.

Calcination of Raw Silica: Raw silica was calcined in a CARBOLITE Model VST 12/600 tube furnace using a EUROTHERM 3216P1 temperature controller, according to the following procedure. The controller was programmed with the desired temperature profile. A quartz tube was filled with 100 g silica, and a valve was opened and adjusted to flow the nitrogen through the tube so that the silica was completely fluidized. The quartz tube was then placed inside the heating zone of the furnace. The silica was heated slowly to the desired temperature and held at this temperature for at least 8 hours to allow complete calcination and removal of water or moisture. After the dehydration was complete, the quartz tube was cooled to RT. Calcined silica was recovered in a silica catcher, and collected into a glass container inside a dry box. Diffuse reflectance infrared Fourier transform spectroscopy (DRIFTS) was used as a quality control check. The silica properties and calcination conditions for the silicas used in the following examples are provided in Table 1.

Two calcination temperatures were used herein, 200° C. and 600° C. (see Tc in Table 1). The 200° C. calcination results in silica having a higher Si—OH concentration on the surface to chemically bind more MAO molecules. This can minimize MAO leaching that may cause reactor fouling, especially in slurry processes where a catalyst with high MAO loading is used. The 600° C. calcination results in less Si—OH concentration on the surface and reduces the local heat generated by the reaction of trimethylaluminum (TMA) in MAO with the surface Si—OH groups. Heat generation should typically be limited for silica with small pores, e.g., <70 Å and lack of >100 Å distributions, to minimize expansion fragmentation of the supported MAO. When expansion fragmentation occurs, solid MAO-dominated particles form. These particles are low in porosity and generally cannot generate a porous enough matrix phase to fill with the desired amount of fill phase.

Supportation of MAO on Silica: The following or a similar procedure was used to prepare the supported MAOs (sMAOs). The desired amount of calcined silica (see Silica Mass in Table 2) was slurried into 6× toluene in a reactor stirred at 500 rpm. The desired amount (mmol Au/g silica, see Table 2) of 30 wt % MAO solution (e.g., 13.6 wt % Al, Albemarle) was added slowly to the reactor to maintain the temperature at the desired MAO addition temperature (see T1, Table 2), then the reactor was stirred at 350 rpm at RT for 30 mins. For the supported MAOs having higher surface areas of 650-800 m$^2$/g with small average pore diameters and lacking >100 Å distributions, e.g., D150-60A (64 Å) or PD13054 (66 Å), the reactor was agitated for an additional 3 hours at RT to minimize or prevent expansion fragmentation (see T2 and T2 Time, Table 2). For the supported MAOs having surface areas of 400-650 m$^2$/g with larger average pore diameters, e.g., D100-100A (110 Å) or D70-120 (120 Å), or with slightly smaller average pore diameter but rich in >100 Å distributions, e.g. PD14024 (92 Å), the reactor was heated to 100° C. and agitated for 3 hours (see T2 and T2 Time, Table 2). For sMAO 1, sMAO 2, sMAO 5, and sMAO 6 in Table 2, the mixture was filtered through a medium frit, the wet solid was washed with 10× toluene, then 10× hexane, and dried under vacuum for 3 hours. It is not necessary to isolate that sMAO as a solid, however, especially when the supernate from the sMAO preparation contains no significant free MAO. For example, for sMAO 3 and sMAO 4 in Table 2, the sMAO was not isolated and dried. Rather, the preparation of the finished catalyst outlined below simply continued without this step, e.g., a "one-pot" reaction. The preparation conditions and yields for each of the supported MAOs are summarized in Table 2.

For comparison to similar catalysts supported on Grace Davison Silica 948, please see FIG. 3 in concurrently filed PCT Application No. PCT/US2016/034784, filed May 27, 2016 entitled "Metallocene Catalyst Compositions and Polymerization Process Therewith"), which is fully incorporated herein by reference.

Finished Catalyst Preparation: A reactor was charged at RT with the desired amount of solid sMAO (see Table 3) and 5× toluene. The slurry was stirred at 350 rpm. TIBAL (neat) was added at 0.34 mmol/g sMAO slowly into the sMAO slurry and the reactor was stirred for 15 mins. Then, the desired catalyst compound and amount (see Catalyst and Zr wt %, Table 3; see Table 4 for the specific catalyst compounds) was added and the solution mixture was stirred for 1 or 2 hours at RT (see Reaction Temp and Reaction Time, Table 3). The slurry was filtered through a medium frit. The wet solid was washed twice with 10× toluene, once with 10× hexane, and dried under vacuum for 3 to 24 hours, yielding free-flowing solid supported catalysts (SCat or CSC). The finished catalyst preparation conditions and yields are summarized in Table 3.

Sequential Polymerization: In the procedure below, a 2L batch reactor is used. The sequential polymerization could be done in one reactor, such as a single batch reactor, or multiple reactors operating batch-wise or continuously. The heterophasic polymers produced below include several iPPs (iPPs 1-10 in Tables 5a and 5b) and ICPs (ICPs 11-16 in Tables 5a and 5b), an RCP having a bimodal composition distribution and comprising a stiff matrix phase and a sticky rubber phase (RCP 17), and a propylene-based rubber also having bimodal composition distribution (BMR 18). While the illustrated polymerization examples have a propylene-based matrix phase, other heterophasic polymers could be produced using a similar reactor set up and procedures. For example, bimodal ethylene-based rubbers or plastomers could be produced using ethylene as monomer instead of propylene and adjusting conditions as needed. As another example, with ethylene or propylene as a base monomer, one or more comonomers could be used to produce a copolymer or terpolymer matrix phase.

I. Reactor Preparation: In a dry box, 1.0 g catalyst slurry containing 5 wt % solid catalyst was charged to a catalyst tube, followed by 1 ml hexane (N$_2$ sparged and mol sieve purified). A 3 mL syringe was charged with 1.0 ml of triisobutyl n-octylaluminum (TNOAL) solution made from 5 ml neat TNOAL in 100 ml hexane or 1.75 mL of 7.6 vol % triisobutylaluminum (TIBAL) solution (e.g., 7.6 mL neat TIBAL in 92.4mL hexane) (see Table 5a). The catalyst tube and the 3 ml syringe were removed from the dry box and the catalyst tube attached to a 2 L reactor while the reactor was being purged with nitrogen. The TNOAL or the TIBAL solution in the syringe was injected into the reactor via the scavenger port capped with a rubber septum. The scavenger port valve was then closed. Propylene (1000 ml) was introduced to the reactor through a purified propylene line. The agitator was brought to 500 rpm, and the mixture was allowed to mix for 5 minutes at RT.

II. Pre-Polymerization: The catalyst slurry in the catalyst tube was then flushed into the reactor with 250 ml propylene. The prepolymerization reaction was allowed to run for a desired period of time t, e.g., 5 minutes, at RT (see Table 5a). Pre-polymerization, while used here, is an optional step in this polymerization procedure.

III. Matrix Phase Polymerization: Polymerization of the matrix phase in these examples was conducted using a first stage polymerization, Stage A1, and in some cases a second stage polymerization, A2.

Stage A1: The reactor temperature was first increased to a desired reaction temperature T$^1$ (see Table 5a), e.g., 70° C. For the examples where ethylene comonomer was used in Stage A1, it was introduced through a pressure controlling valve at a set pressure (e.g., 20 psi, see Table 5a), and the temperature $T^1$ was maintained for a desired period of time $t^1$ (e.g., 30 min, see Table 5a). For the examples where hydrogen was used in Stage A1, it was introduced through the valve at a set pressure (e.g., 20 psi or 30 psi, see Table 5a) and the temperature $T^1$ was again maintained for the desired period of time $t^1$. For all other examples in Table 5a, the temperature $T^1$ was simply maintained for a desired period of time $t^1$. The reactor agitator was maintained at 500 rpm.

Although hydrogen was not used in most of the examples in Stage A1, it could be used in any of the examples to produce a bimodal MWD matrix phase as was done in examples iPP 8-10 and ICP 11-14, with the zero $H_2$ step producing the high molecular weight component and the $H_2$ step producing the low molecular weight component. Likewise, a different monomer or comonomer could be used depending on the target product.

Stage A2: Stage A2 was only used for iPPs 9-11 and ICPs 11-14. At the end of the Stage A1 running time $t^1$, a 150 mL bomb with the desired pressure of $H_2$ (e.g., 30 psi, see Table 5a) of $H_2$ was opened to the reactor. Following the $H_2$ introduction, the reactor pressure and temperature increased by about 32 psi and 3° C., respectively. The reaction was allowed to run for a desired period of time $t^2$ (e.g., 10 minutes, see Table 5a).

Although comonomer was not used in Stage A2 in these examples, it could be used instead of or in addition to $H_2$, depending on the target product. Stage A2 could also be run at a different temperature from Stage A1, for example, to further tailor molecular weight.

II. Fill Phase Formation: At the $(t+t^1+t^2-1)$ minute mark (where Stage A2 was not used, $t^2=0$), the agitator was set to 250 rpm. At the $(t+t^1+t^2)$ minute mark, the reactor pressure was vented to about 214 psig, while the reactor temperature was maintained as closely as possible to desired temperature $T^3$ (e.g., 70° C., see Table 5b). The agitator was then increased back to 500 rpm. The reactor temperature was stabilized at $T^3$ with the reactor pressure reading about 215 psig. Ethylene gas was then introduced into the reactor, targeting a C2/C3 pressure ratio as provided in Table 5b (e.g., 136/214 C2/C3 psi ratio and a total reactor pressure of about 350 psig). The reactor was held at this pressure for $t^3$ minutes (e.g., 20 minutes, see Table 5b). The reactor was then quickly vented to stop the polymerization, and then the reactor bottom was dropped to collect a polymer sample. After overnight drying, the total yield was determined (e.g., 254 g, see Table 5b), of granules that were free-flowing at RT. The reaction conditions, catalyst performance, and product data are summarized in Tables 5a and 5b.

A fill phase was not produced for the iPP examples provided, although one of ordinary skill in the art in possession of this disclosure could readily produce such.

TABLE 1

Silica Properties and Calcination Temperature

| Support ID | Support | Tc ° C. | PS um | SA $m^2/g$ | PV mL/g | PD nm (Å) |
|---|---|---|---|---|---|---|
| Support I | AGC D150-60A | 600 | 150 | 733 | 1.17 | 6.4 (64) |
| Support II | PQ PD13054 | 600 | 130 | 671 | 1.11 | 6.6 (66) |
| Support III | AGC D100-100A | 200 | 100 | 543 | 1.51 | 11 (110) |
| Support IV | PQ PD-14024 | 200 | 85 | 611 | 1.40 | 9.2 (92) |
| Support V | AGC D70-120A | 200 | 70 | 450 | 1.64 | 12 (120) |
| Support VI | AGC D70-120A | 600 | 70 | 450 | 1.64 | 12 (120) |

Tc—Calcination temperature; PS—average particle size (from manufacturer); SA—BET surface area (from manufacturer); PV—pore volume (from manufacturer); PD—pore diameter (from manufacturer).

TABLE 2

Supported MAO Preparation Conditions

| sMAO ID | Support ID | Silica Mass (g) | $MAO^a$ (mmol Al/g) | $T1^b$ (° C.) | $T2^c$ (° C.) | T2 Time$^d$ (hr) | Yield (g) |
|---|---|---|---|---|---|---|---|
| sMAO 1 | Support I | 10.67 | 7.0 | −20 | RT | 3 | 14.68 |
| sMAO 2 | Support II | 5.01 | 7.0 | −20 | RT | 3 | 7.02 |
| sMAO 3 | Support III | 317 | 13.0 | −10 | 100 | 3 | 493$^e$ |
| sMAO 4 | Support IV | 340 | 13.0 | −10 | 100 | 3 | 620$^e$ |
| sMAO 5 | Support V | 5.11 | 10.5 | −20 | 100 | 3 | 8.04 |
| sMAO 6 | Support VI | 10.0 | 12.0 | −20 | 100 | 3 | 18.1 |

$^a$MAO proportions given in total mmol Al/g silica;
$^b$MAO addition temperature T1;
$^c$MAO reaction temperature T2 after MAO addition;
$^d$Time for MAO under reaction temperature T2;
$^e$Large scale one-pot reaction, no isolation of sMAO, using final catalyst mass that is close to sMAO mass.

TABLE 3

Finished Supported Catalyst Data

| Catalyst | | $Zr^a$ (wt %) | sMAO ID | sMAO (g) | Reaction Temp (° C.) | Reaction Time (hours) | Yield (g) |
|---|---|---|---|---|---|---|---|
| Cat 1 | MCN1 | 0.16 | sMAO 1 | 14.68 | RT | 1 | 14.23 |
| Cat 2 | MCN3 | 0.16 | | 7.10 | RT | 1 | 6.98 |
| Cat 3 | MCN2 | 0.20 | | 1.00 | RT | 1 | 0.98 |
| Cat 4 | MCN2 | 0.20 | sMAO 2 | 7.01 | RT | 1 | 7.02 |
| Cat 5 | MCN1 | 0.16 | sMAO 3 | 493 | RT | 2 | 493 |

TABLE 3-continued

Finished Supported Catalyst Data

| Catalyst | Zr[a] (wt %) | sMAO ID | sMAO (g) | Reaction Temp (° C.) | Reaction Time (hours) | Yield (g) |
|---|---|---|---|---|---|---|
| Cat 6 | MCN3 | 0.16 | | 224 | RT | 2 | 224 |
| Cat 7 | MCN4 | 0.16 | sMAO 4 | 620 | RT | 2 | 620 |
| Cat 8 | MCN3 | 0.08 | | 1.00 | RT | 1 | 0.98 |
| Cat 9 | MCN4 | 0.16 | sMAO 6 | 5.01 | RT | 1 | 5.05 |
| Cat 10 | MCN3 | 0.12 | | 1.00 | RT | 1 | 0.96 |

[a]Zr wt % is based on the charge of the metallocene according to the calculation: Zr wt % = w-MCN × (91.2/Mw-MCN)/w-sMAO, wherein w-MCN is the charged metallocene weight, Mw-MCN is the metallocene molecular weight, and w-sMAO is the weight of sMAO.

TABLE 4

Catalysts

| Catalyst | Catalyst precursor compound |
|---|---|
| MCN1 | rac-dimethylsilyl bis(2-cyclopropyl-4-(3',5'-di-tert-butylphenyl)-indenyl) zirconium dichloride |
| MCN2 | rac-dimethylsilyl bis(2-methyl-4-phenyl-indenyl) zirconium dimethyl |
| MCN3 | rac-dimethylsilyl bis(2-methyl-4-(3',5'-di-tert-butyl-4'-methoxy-phenyl)-indenyl) zirconium dichloride |
| MCN4 | rac-dimethylsilyl(4-(3',5'-di-tert-butyl-4'-methoxy-phenyl)-2-methyl indenyl)(4-o-biphenyl 2-hexyl-indenyl)zirconium dichloride |

TABLE 5a

Polymerization Data

| Poly ID | Catalyst & Charge (mg) | TNOAL or TIBAL | Prepolymerization Time, t (min) | Matrix Phase A1 $T^1$ (° C.) | $t^1$ (min) | C2 or $H_2$ (psi) | Matrix Phase A2 $T^2$ (° C.) | $t^2$ (min) | C2 or $H_2$ (psi) |
|---|---|---|---|---|---|---|---|---|---|
| iPP 1 | Cat 1, 190 | TNOAL | 10 | 70 | 40 | 0 | | | |
| iPP 2 | Cat 2, 100 | TNOAL | 10 | 70 | 50 | 0 | | | |
| iPP 3 | Cat 5, 100 | TNOAL | 10 | 70 | 40 | 0 | | | |
| iPP 4 | Cat 7, 50 | TIBAL | 10 | 70 | 40 | 0 | | | |
| iPP 5 | Cat 1, 250 | TNOAL | 10 | 70 | 20 | $H_2$, 30 | | | |
| iPP 6 | Cat 7, 30 | TIBAL | 10 | 70 | 40 | $H_2$, 20 | | | |
| iPP 7 | Cat 9, 30 | TNOAL | 10 | 70 | 40 | $H_2$, 20 | | | |
| iPP 8 | Cat 4, 100 | TNOAL | 10 | 70 | 50 | 0 | 70 | 10 | $H_2$, 15 |
| iPP 9 | Cat 3, 100 | TNOAL | 10 | 70 | 50 | 0 | 70 | 5 | $H_2$, 15 |
| iPP 10 | Cat 7, 30 | TIBAL | 10 | 70 | 30 | 0 | 70 | 10 | $H_2$, 55 |
| ICP 11 | Cat 1, 100 | TNOAL | 10 | 70 | 50 | 0 | 70 | 10 | $H_2$, 30 |
| ICP 12 | Cat 4, 100 | TNOAL | 10 | 70 | 50 | 0 | 70 | 10 | $H_2$, 30 |
| ICP 13 | Cat 5, 20 | TNOAL | 10 | 70 | 10 | 0 | 70 | 15 | $H_2$, 30 |
| ICP 14 | Cat 7, 30 | TIBAL | 10 | 70 | 30 | 0 | 70 | 10 | $H_2$, 55 |
| ICP 15 | Cat 1, 50 | TNOAL | 10 | 70 | 40 | 0 | | | |
| ICP 16 | Cat 7, 30 | TIBAL | 10 | 70 | 30 | 0 | | | |
| RCP 17 | Cat 7, 50 | TIBAL | 10 | 70 | 30 | C2, 20 | | | |
| BMR 18 | Cat 7, 30 | TIBAL | 10 | 60 | 30 | C2, 20 | | | |

TABLE 5b

Polymerization Data, Continued

| Poly ID | Catalyst & Charge (mg) | Fill Phase $T^3$ (° C.) | $t^3$ (min) | C2/C3 (psi/psi) | Activity (g/g cat/hr) | Yield (g) | Total C2[a] [Fill Phase][b] (wt %) | Fill Phase C2:C3[c] (mol:mol) |
|---|---|---|---|---|---|---|---|---|
| iPP 1 | Cat 1, 190 | | | | 1179 | 149.4 | | |
| iPP 2 | Cat 2, 100 | | | | 265 | 22.1 | | |
| iPP 3 | Cat 5, 100 | | | | — | — | | |
| iPP 4 | Cat 7, 50 | | | | 3822 | 127.4 | | |
| iPP 5 | Cat 1, 250 | | | | 1157 | 96.4 | | |
| iPP 6 | Cat 7, 25 | | | | 10521 | 177.8 | | |
| iPP 7 | Cat 9, 25 | | | | 18618 | 313.4 | | |
| iPP 8 | Cat 4, 100 | | | | 429 | 42.9 | | |
| iPP 9 | Cat 3, 100 | | | | 324 | 29.7 | | |
| iPP 10 | Cat 7, 25 | | | | 6972 | 116.2 | | |

TABLE 5b-continued

Polymerization Data, Continued

| Poly ID | Catalyst & Charge (mg) | Fill Phase T[3] (° C.) | t[3] (min) | C2/C3 (psi/psi) | Activity (g/g cat/hr) | Yield (g) | Total C2[a] [Fill Phase][b] (wt %) | Fill Phase C2:C3[c] (mol:mol) |
|---|---|---|---|---|---|---|---|---|
| ICP 11 | Cat 1, 100 | 70 | 20 | 136/214 | 1904 | 253.8 | 13 [37] | 45:55 |
| ICP 12 | Cat 4, 100 | 70 | 20 | 136/214 | 692 | 92.25 | 13 [37] | 45:55 |
| ICP 13 | Cat 5, 20 | 70 | 20 | 136/214 | 4450 | 66.75 | 11 [45] | 25:75 |
| ICP 14 | Cat 7, 25 | 70 | 25 | 170/180 | 9645 | 281.3 | 11.6 [30] | 55:45 |
| ICP 15 | Cat 1, 50 | 70 | 20 | 136/214 | 1248 | 62.4 | 21 [60] | 45:55 |
| ICP 16 | Cat 7, 25 | 70 | 30 | 170/180 | 5316[d] | 132.9 | 55 [>80][e] | NM[g] |
| RCP 17 | Cat 7, 50 | 70 | 9 | 170/180 | 12769 | 415.0 | 6.3 [16] | 52:48 |
| BMR 18 | Cat 7, 25 | 70 | 30 | 170/180 | 7976[f] | 203 | 33.7 [>75][e] | 55:45 |

[a]From GPC-IR;
[b]Estimated from RT xylene extraction results × 1.33, a correction factor from 80° C. xylene extraction that gives more accurate rubber phase wt %, e.g., 40 wt % (80° C.)/30 wt % (RT) = 1.33;
[c]From H[1]-NMR;
[d] About 25 wt % of the polymer agglomerated;
[e]">" sign indicates a completely dissolved sample at RT and the fill phase content was estimated based on GPC-IR deconvolution;
[f] Some agglomerated granules were formed near the stirrer;
[g]"NM" means this value was not measured.

Figure 4A:
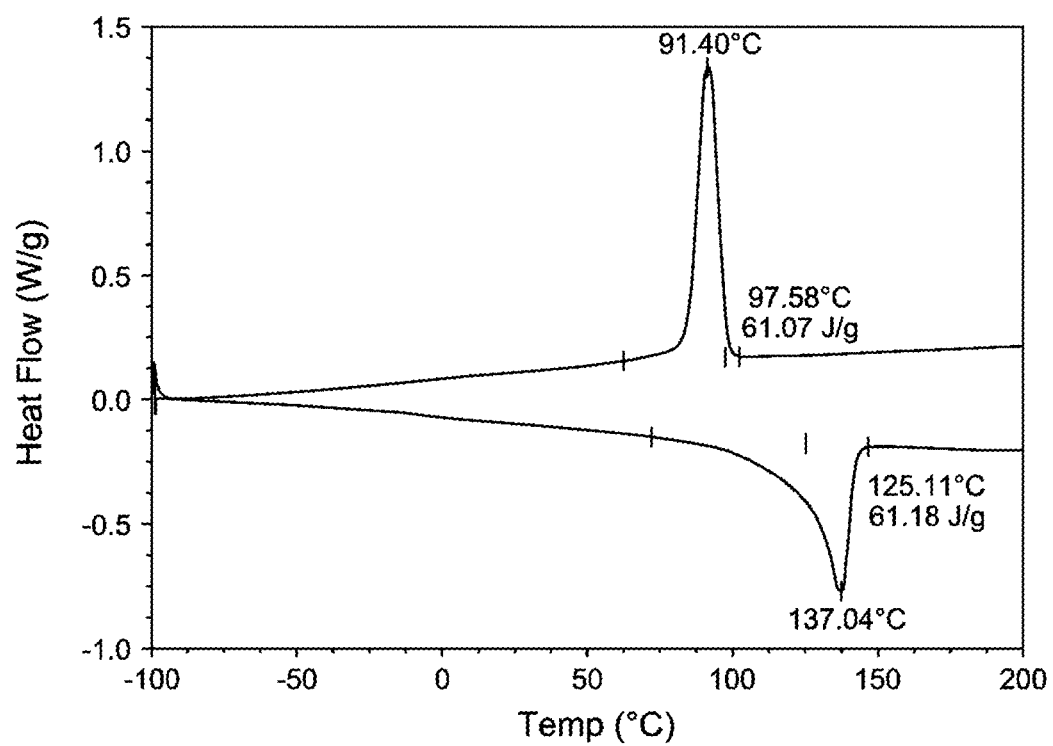
FIGS. 4a and 4b provide DSC curves for two polymer samples produced as described in the experimental section.
Figure 4B:
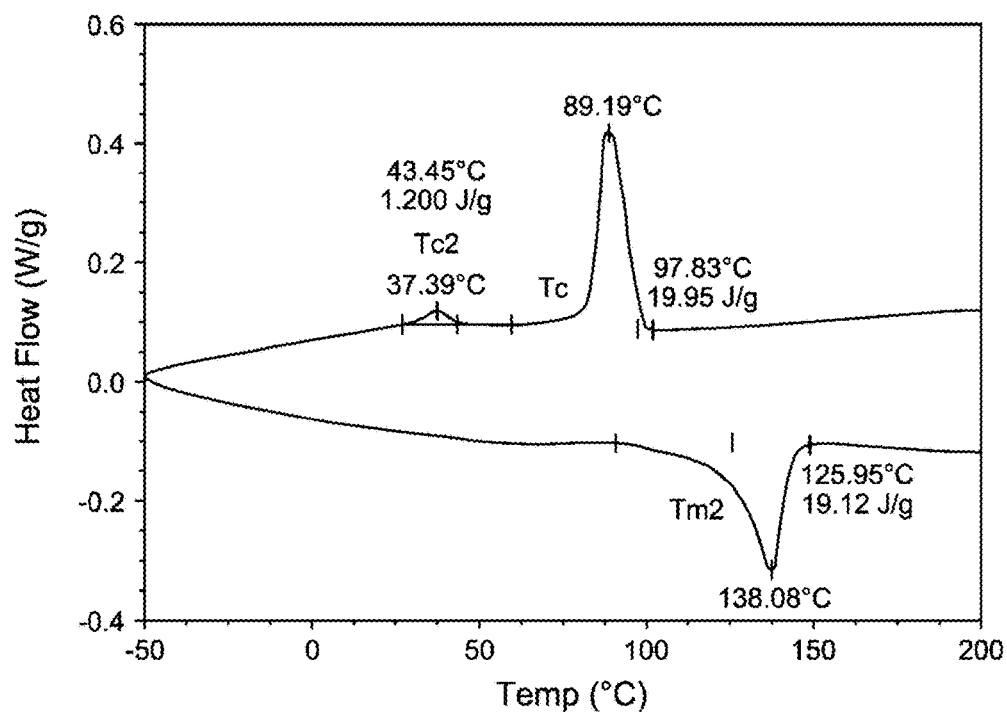
Figure 5A:
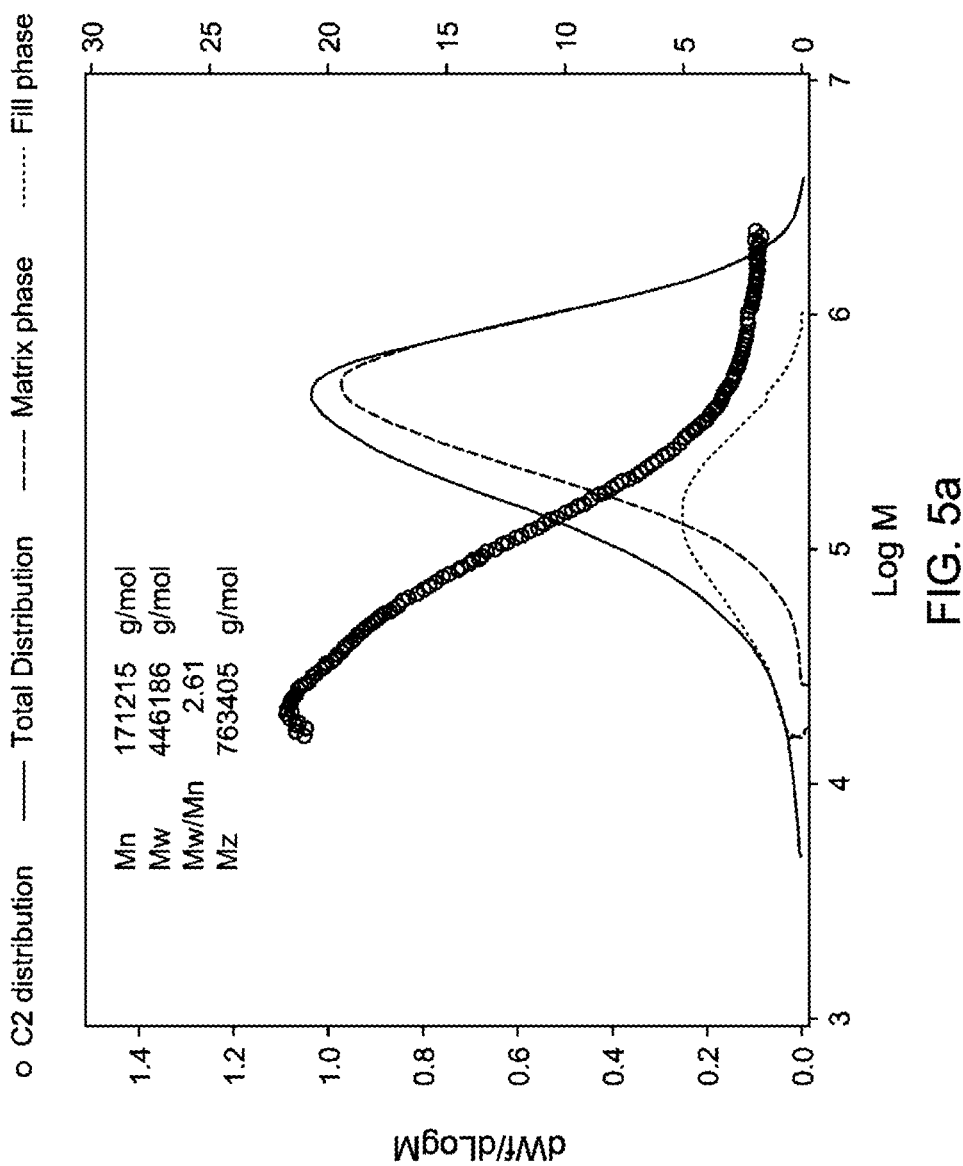
FIGS. 5a and 5b provide GPC-IR curves for two polymer samples produced as described in the experimental section.
Figure 5B:
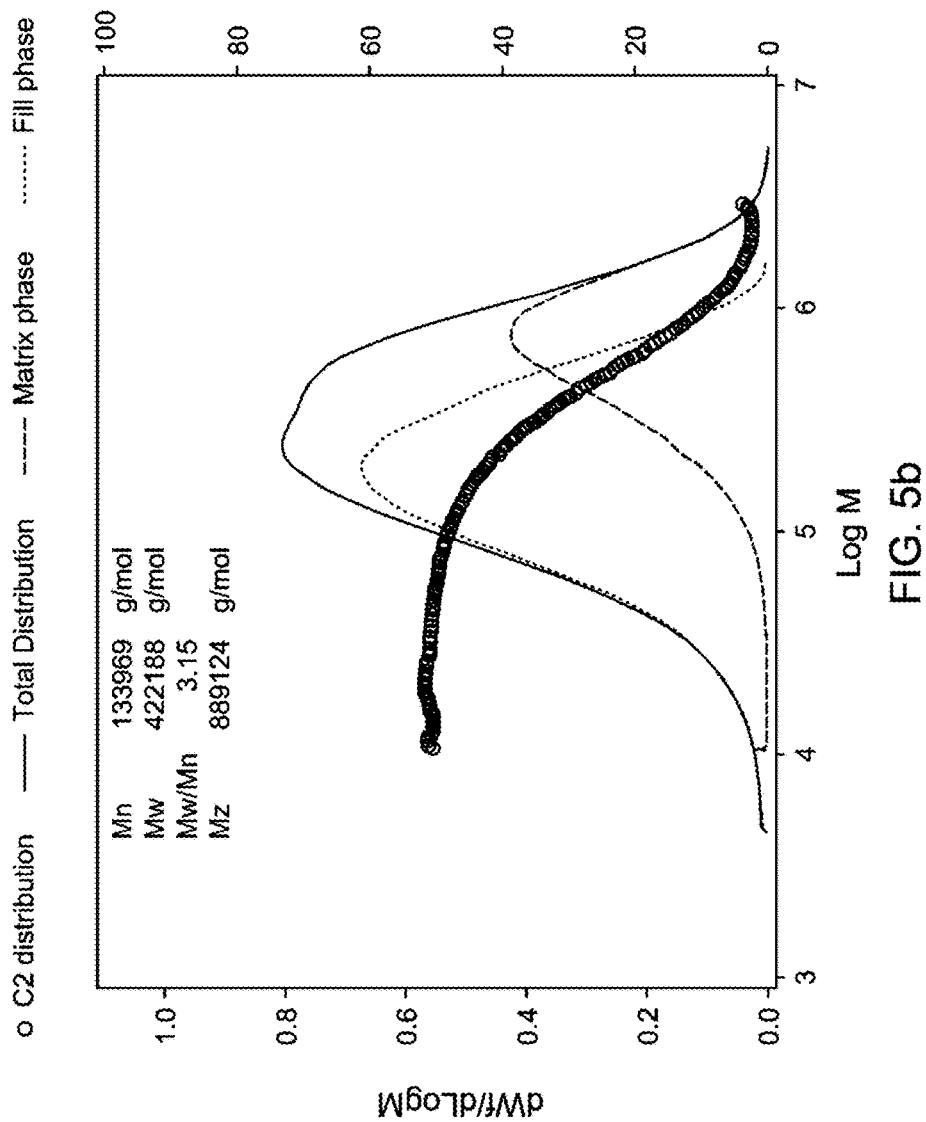
Figure 6A:
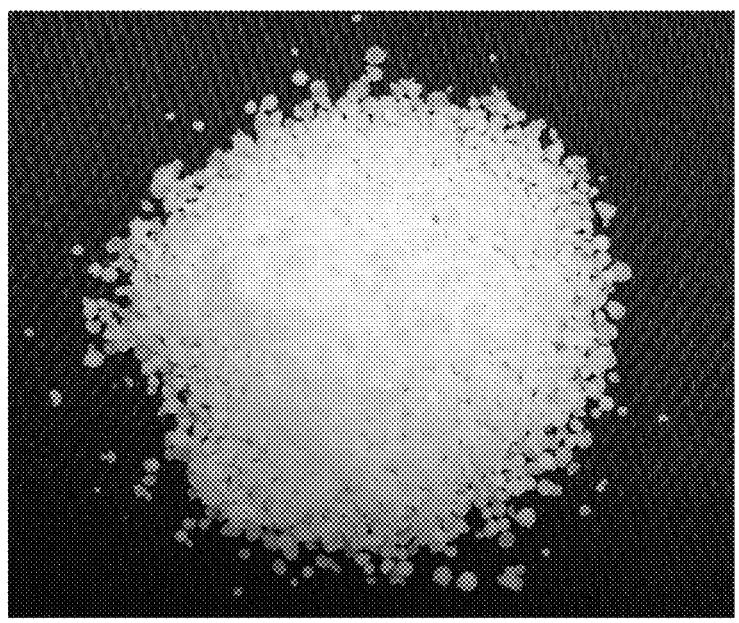
FIGS. 6a and 6b provide optical images of two polymer samples produced as described in the experimental section.
Figure 6B:
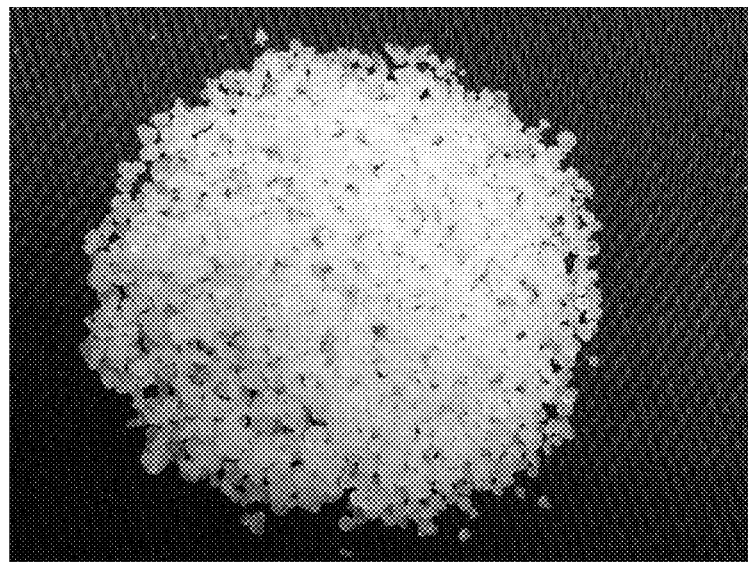

Examples RCP 17 and BMR 18 were further characterized by DSC (see FIGS. 4a and 4b, respectively) and by GPC-IR with de-convolution (see FIGS. 5a and 5b, respectively). Both examples were also extracted with xylene at 130° C. to total dissolve, and then recrystallized at RT. In this RT extraction, 11.4 wt % xylene extractables was obtained for RCP 17. Almost 100% extractables (totally dissolved) was obtained for BMR 18, although the GPC-IR results (FIG. 5b) show that the fill phase is about 75 wt %. Example RCP 17 was further analyzed with H[1]-NMR spectroscopy, which showed that the total C2:C3 was 22:78, while the C2:C3 in the xylene extractables is 52:48. Example BMR 18 was also analyzed with H[1]-NMR spectroscopy, which showed that the total C2:C3 ratio was 53:47, consistent with the completely dissolved polymer material. Optical images of both RCP 17 and BMR 18, respectively, are provided in FIGS. 6a and 6b, showing that both products are granular and free-flowing at RT. Additionally, both products were observed to be granular and free-flowing after four months of storage at RT.

H[1]-NMR for C2:C3 for Fill Phase: To determine C2:C3 content, about 20 mg of the desired polymer sample was dissolved at 135° C. in 1,1,2,2-tetrachloroethane (TCE) and then transferred to a 5 mm NMR tube. A 1D H[1] NMR experiment was performed with a flip angle of 30 degrees and a relaxation delay of 5 seconds, at a temperature of 120° C. The C2 and C3 composition in mole and weight percent was determined using the computerized method developed by Cheng and Lee and described in Polymer Bulletin 12, 463-470 (1984) and Journal of Polymer Science: Part B: Polymer Physics, 25, 2355-2370 (1987), both of which are herein incorporated by reference in their entirety. The method involves integrating the spectrum into four regions: 2.00-1.48 ppm (A), 1.48-1.24 ppm (B), 1.24-1.04 ppm (C), and 1.04-0.60 ppm (D), to which assignments have been confirmed, using 2D NMR methods outlined in the publications listed above. The regions are then used in a simulation of an ethylene-propylene copolymerization, using a first-order Markovian probability to estimate composition of the polymer.

Heterophasic Copolymer Granule Particle Size Distribution: Certain heterophasic copolymer granular samples were sieved through a Meinzer II™ Sieve Shaker, commercially available from Advantech Manufacturing, to obtain particle size distributions. An eleven seive set with sizes of 90, 125, 335, 500, 710, 1000, 1400, 1700, 2360, 4000, and 9500 μm was used. The results are summarized in Table 6.

TABLE 6

PSDs of Certain Samples from Tables 5a/5b

| | ICP 14 | | | RCP 17 | | | BMR 18 | | |
|---|---|---|---|---|---|---|---|---|---|
| Sieve Size (μm) | Weight (g) | Wt % | Accumulation | Weight (g) | Wt % | Accumulation | Weight (g) | Wt % | Accumulation |
| 90 | 0 | 0 | 0 | 0 | 0 | 0 | 0 | 0 | 0 |
| 125 | 0 | 0 | 0 | 0 | 0 | 0 | 0 | 0 | 0 |
| 335 | 0 | 0 | 0 | 0 | 0 | 0 | 0 | 0 | 0 |
| 500 | 0 | 0 | 0 | 0.40 | 3.87 | 3.87 | 0 | 0 | 0 |
| 710 | 0 | 0 | 0 | 0.75 | 7.26 | 11.13 | 0 | 0 | 0 |
| 1000 | 3.5 | 5.51 | 5.51 | 3.34 | 32.33 | 43.47 | 0.11 | 0.13 | 0.13 |
| 1400 | 8.0 | 12.60 | 18.11 | 2.60 | 25.17 | 68.64 | 3.51 | 4.08 | 4.21 |
| 1700 | 21.0 | 33.07 | 51.18 | 3.13 | 30.30 | 95.06 | 35.46 | 41.19 | 45.40 |

TABLE 6-continued

PSDs of Certain Samples from Tables 5a/5b

| | Poly ID | | | | | | | | |
|---|---|---|---|---|---|---|---|---|---|
| | ICP 14 | | | RCP 17 | | | BMR 18 | | |
| Sieve Size (μm) | Weight (g) | Wt % | Accumulation | Weight (g) | Wt % | Accumulation | Weight (g) | Wt % | Accumulation |
| 2360 | 29.17 | 45.94 | 97.12 | 0.11 | 1.06 | 100 | 40.83 | 47.43 | 92.83 |
| 4000 | 1.83 | 2.88 | 100 | 0 | 0 | 100 | 6.17 | 7.17 | 100 |
| 9500 | 0 | 0 | 100 | 0 | 0 | 100 | 0 | 0 | 100 |
| Total (g) | 63.5 | | | 10.33 | | | 86.08 | | |

Figure 7A:
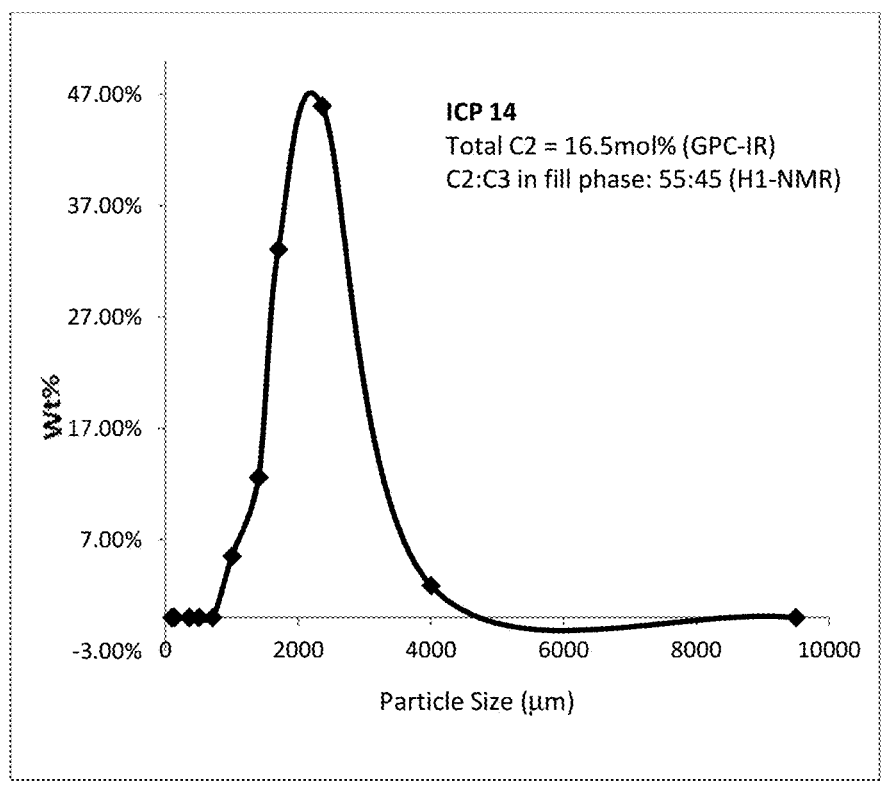
FIGS. 7a, 7b, and 7c provide particle size distributions for three polymer samples produced as described in the experimental section.
Figure 7B:
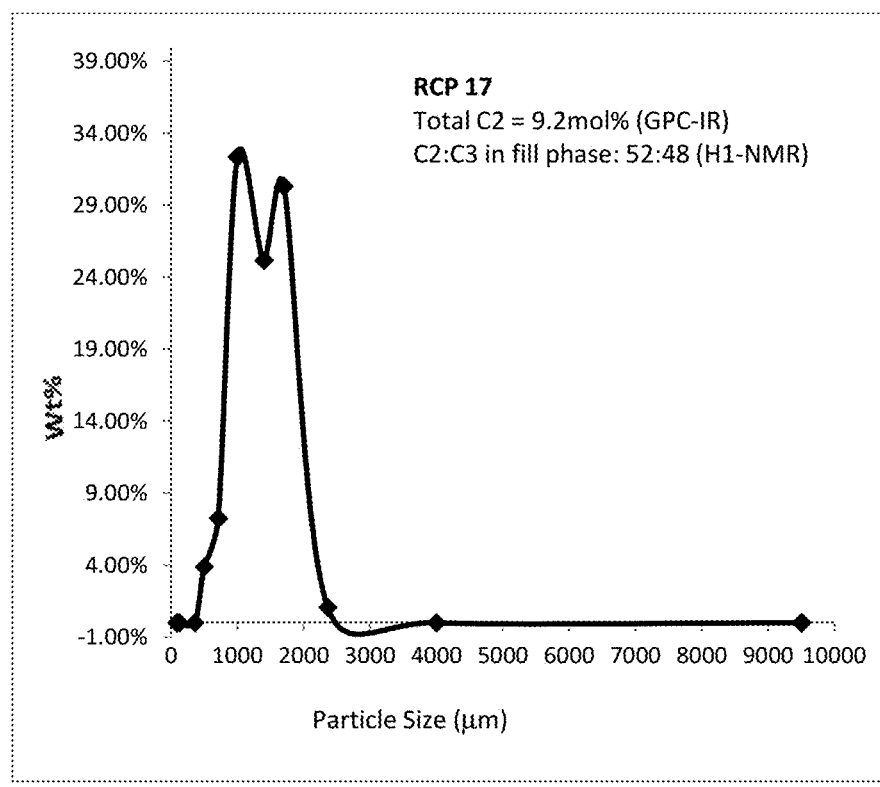
Figure 7C:
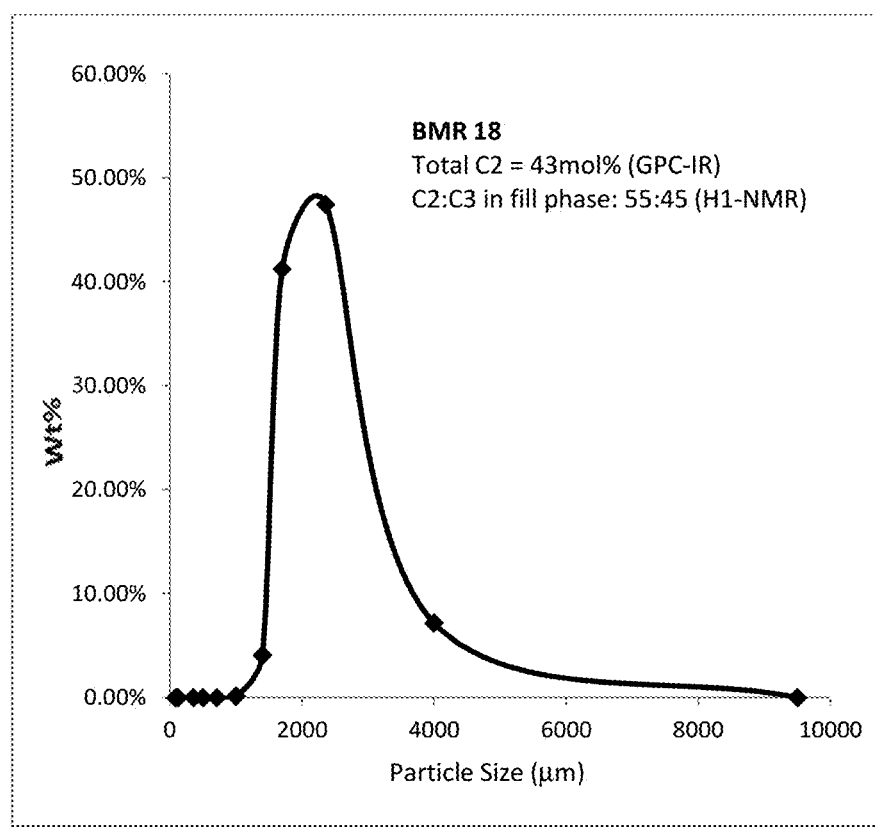

Particle size distribution plots for the samples in Table 6 are provided in FIGS. 7a (ICP 14), 7b (RCP 17), and 7c (BMR 18). The total C2 wt % in Table 5b was converted to mol % using the formula C2 mol %=(C2 wt %/28.05)/[C2 wt %/28.05+(1−C2 wt %)/42.08], wherein 28.05 and 42.08 are the ethylene unit and propylene unit molecular weights, respectively. The C2 mol % for each sample is shown in FIGS. 7a, 7b, and 7c, respectively.

All documents described herein are incorporated by reference herein for purposes of all jurisdictions where such practice is allowed, including any priority documents, related application and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A method for making a heterophasic polymer, the method comprising:
    a. contacting a single-site catalyst precursor, an activator, and a support to produce a catalyst system, wherein the support comprises silica and is characterized by an average surface area of from 400 m²/g to 800 m²/g;
    b. contacting a monomer and optionally a comonomer in at least one gas or slurry phase reactor with the catalyst system under polymerization conditions comprising a first molar ratio of monomer to comonomer of from 90:10 to 100:0, to produce a porous matrix phase that, when comonomer is present, comprises a random statistical distribution of comonomer units;
    c. adjusting, in the presence of the matrix phase, the polymerization conditions to a second molar ratio of monomer to comonomer of from 90:10 to 10:90 to produce a fill phase at least partially filling pores in the matrix phase; and
    d. recovering a reactor effluent comprising a granular heterophasic polymer.

2. The method of claim 1, wherein the catalyst system comprises a support having:
    an average pore diameter of from 60 to 200 Angstrom;
    at least 20% of the incremental pore volume comprised of pores having a pore diameter larger than 100 Angstrom; and
    an activator comprising aluminoxane, wherein the aluminoxane loading is at least 7 mmol Al/g silica.

3. The method of claim 1, wherein the contacting in b) and the adjusting in c) occur in a single reactor.

4. The method of claim 3, wherein the single reactor is a gas phase fluidized bed reactor or a single tank autoclave reactor or a loop reactor operating in slurry phase.

5. The method of claim 1, wherein the contacting in b) occurs in at least one first reactor and the adjusting in c) occurs in at least one second reactor.

6. The method of claim 1, wherein the contacting in b) occurs in at least one single tank autoclave reactor or a loop reactor operating in slurry phase, and the adjusting in c) occurs in at least one gas phase fluidized bed reactor.

7. The method of claim 1, wherein the contacting in b) occurs in at least one gas phase fluidized bed reactor, and the adjusting in c) occurs in at least one single tank autoclave reactor or at least one loop reactor operating in slurry phase.

8. The method of claim 1, wherein comonomer is present and the monomer is propylene and the comonomer is ethylene.

9. The method of claim 1, wherein the polymerization conditions comprise a temperature from about 10° C. to less than 135° C.

10. The method of claim 1, wherein the single-site catalyst precursor comprises a compound represented by the formula:

$$(Cp)_m R^4_n M^4 Q_k$$

wherein:
    each Cp is a cyclopentadienyl, indenyl, or fluorenyl moiety substituted by one or more hydrocarbyl radicals having from 1 to 20 carbon atoms;
    $R^4$ is a bridge between two Cp rings;
    $M^4$ is a transition metal selected from group 4 or 5;
    Q is a hydride or a hydrocarbyl group having from 1 to 20 carbon atoms, an alkenyl group having from 2 to 20 carbon atoms, or a halogen;
    m is 1, 2, or 3, with the proviso that if m is 2 or 3, each Cp may be the same or different;
    n is 0 or 1, with the proviso that n=0 if m=1; and
    k is such that k+m is equal to the oxidation state of $M^4$, with the proviso that if k is greater than 1, each Q may be the same or different.

11. The method of claim 1, wherein the single-site catalyst precursor comprises a compound represented by the formula:

$$R^A(CpR''_p)(CpR^*_q)M^5 Q_r.$$

wherein:

each Cp is a cyclopentadienyl moiety or substituted cyclopentadienyl moiety;

each R* and R" is a hydrocarbyl group having from 1 to 20 carbon atoms and may be the same or different;

p is 0, 1, 2, 3, or 4;

q is 1, 2, 3, or 4;

$R^A$ is a bridge between the Cp moieties;

$M^5$ is a group 4, 5, or 6 metal;

Q is a hydrocarbyl radical having 1 to 20 carbon atoms or is a halogen;

r is s minus 2, where s is the valence of $M^5$;

$(CpR^*_q)$ has bilateral or pseudobilateral symmetry, wherein $R^*_q$ is selected such that $(CpR^*_q)$ forms a fluorenyl, alkyl substituted indenyl, or tetra-, tri-, or dialkyl substituted cyclopentadienyl radical;

$(CpR''_p)$ contains a bulky group in one and only one of the distal positions, wherein the bulky group is of the formula $AR^W_V$; and A is chosen from group 4 metals, oxygen, or nitrogen, $R^W$ is a methyl radical or phenyl radical, and v is the valence of A minus 1.

12. The method of claim 1, wherein the single-site catalyst precursor comprises a compound represented by the formula:

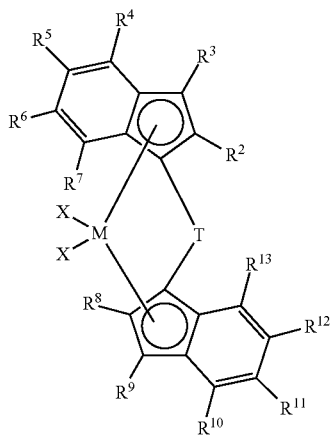

wherein:

M is a metal from group 4, 5 or 6;

T is a bridging group;

each X is, independently, an anionic leaving group;

each $R^2$, $R^3$, $R^4$, $R^5$, $R^6$, $R^7$, $R^8$, $R^9$, $R^{10}$, $R^{11}$, $R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group.

13. The method of claim 1, wherein the single-site catalyst precursor comprises a compound represented by the formula:

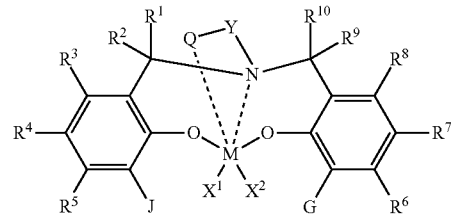

wherein:

M is a group 4 transition metal;

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;

each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ ydrocarbyl radical, a substituted $C_1$ to $C_{40}$ hydrocarbyl radical, a heteroatom, a heteroatom-containing group or each $R^1$, $R^2$, $R^3$, $R^4$, $R^5$, $R^6$, $R^7$, $R^8$, $R^9$, and $R^{10}$ is a functional group comprising of elements from groups 13 to 17, wherein two or more of $R^1$ to $R^{10}$ optionally independently join together to form a $C_4$ to $C_{62}$ cyclic or polycyclic ring structure;

Q is a neutral donor group;

J is a $C_7$ to $C_{60}$ fused polycyclic group, optionally comprising up to 20 atoms from groups 15 and 16, where at least one ring is aromatic and where at least one ring, which may or may not be aromatic, has at least 5 members;

G is, independently, as defined for J or a hydrogen, a $C_1$ to $C_{60}$ hydrocarbyl radical, a substituted hydrocarbyl radical, a heteroatom, or a heteroatom-containing group, or G optionally forms a $C_4$ to $C_{60}$ cyclic or polycyclic ring structure with $R^6$, $R^7$, or $R^8$, or a combination thereof; and Y is a divalent $C_1$ to $C_{20}$ hydrocarbyl or a substituted divalent hydrocarbyl group.

14. The method of claim 1, wherein the support comprises agglomerates of primary particles.

15. The method of claim 14, wherein the primary particles have an average particle size of from 0.01 µm to 20 µm and the agglomerates have an average particle size of 30 to 200 µm.

16. The method of claim 14, wherein the primary particles have a narrow particle size distribution, characterized by a D10 not smaller than 80% of D50 and a D90 not larger than 120% of D50.

17. The method of claim 1, wherein the support is spray dried prior to the contacting in b).

18. The method of claim 1, wherein carbon black is not present during the contacting in b) and the adjusting in c).

19. The method of claim 1, wherein the heterophasic polymer comprises 7 to 85 wt % fill phase, based on the total weight of the matrix and fill phases.

20. The method of claim 1, wherein the heterophasic polymer is free-flowing.

21. The method of claim 1 wherein the granular heterophasic polymer comprises:

a matrix phase comprising:

at least 90 mol % monomer and from 0 to 10 mol % comonomer, based on the total moles of monomer and comonomer the matrix phase;

a porosity of 20% or more as determined by mercury intrusion porosimetry;
a median pore diameter of 165 μm or less as determined by mercury intrustion porosimetry;
a random statistical distribution of monomer units; and
a composition distribution breadth index of 50% or more; and
a fill phase at least partially filling pores in the matrix phase, wherein the fill phase is from 12 to 90 wt % of the polymer, based on the total weight of the matrix and fill phases; and wherein the monomer to comonomer molar ratio in the fill phase is from 80:20 to 20:80.

22. The method of claim 21, wherein the polymer is granular and free-flowing, and part of a reactor effluent withdrawn from a reactor.

23. The method of claim 21, wherein the monomer is propylene and the comonomer is ethylene or the monomer is ethylene and the comonomer is at least one $C_3$ to $C_{12}$ olefin and/or diene.

24. The method of claim 21, wherein the polymeris a copolymer and has a bimodal composition distribution in a GPC-IR trace.

25. The method of claim 21, wherein the matrix phase comprises polyethylene homopolymer or syndiotactic polypropylene.

26. The method of claim 21, wherein the fill phase comprises EPDM.

27. A method for making a heterophasic polymer, the method comprising:
  a. contacting a single-site catalyst precursor, an activator, and a support to produce a catalyst system, wherein the support comprises silica and is characterized by an average surface area of from 400 $m^2/g$ to 800 $m^2/g$;
  b. contacting a monomer and a comonomer in at least one gas or slurry phase reactor with the catalyst system under polymerization conditions comprising a first molar ratio of monomer to comonomer of from 90:10 to 100:0, to produce a porous matrix phase comprising a random statistical distribution of comonomer units;
  c. adjusting, in the presence of the matrix phase, the polymerization conditions to a second molar ratio of monomer to comonomer of from 90:10 to 10:90 to produce a fill phase at least partially filling pores in the matrix phase; and
  d. recovering a reactor effluent comprising a granular heterophasic polymer.

28. The method of claim 21, wherein the polymer has a bimodal molecular weight distribution.

29. The method of claim 21, wherein the polymer is a copolymer and has a bimodal composition distribution in a GPC-IR trace and a bimodal molecular weight distribution.

30. The method of claim 1, wherein comonomer is present and the monomer is ethylene and the comonomer is at least one $C_3$ to $C_{12}$ olefin.

31. The method of claim 1 wherein the granular heterophasic polymer comprises:
  a matrix phase comprising:
    at least 90 mol % monomer and from 0.1 to 10 mol % comonomer, based on the total moles of monomer and comonomer the matrix phase;
    a porosity of 20% or more as determined by mercury intrusion porosimetry;
    a median pore diameter of 165 μm or less as determined by mercury intrustion porosimetry;
    a random statistical distribution of monomer units; and
    a composition distribution breadth index of 50% or more; and
  a fill phase at least partially filling pores in the matrix phase, wherein the fill phase is from 12 to 90 wt % of the polymer, based on the total weight of the matrix and fill phases; and wherein the monomer to comonomer molar ratio in the fill phase is from 80:20 to 20:80.

32. The method of claim 1, wherein the single-site catalyst precursor comprises one or more of:
  dimethylsilylene-bis(2-cyclopropyl-4-phenylindenyl)zirconium dichloride; dimethylsilylene-bis(2-cyclopropyl-4-phenylindenyl)hafnium dichloride;
  dimethylsilylene-bis(2-methyl-4-phenylindenyl)zirconium dichloride;
  dimethylsilylene-bis(2-methyl-4-phenylindenyl)hafnium dichloride;
  dimethylsilylene-bis(2-methyl-4-orthobiphenylindenyl) hafnium dichloride;
  dimethylsilylene-bis(2-methyl-4-orthobiphenylindenyl) zirconium dichloride;
  dimethylsilylene-(2-cyclopropyl-4-orthobiphenylindenyl)(2-methyl-4-3',5'-di-t-butylphenylindenyl)hafnium dichloride;
  dimethylsilylene-(2-cyclopropyl-4-orthobiphenylindenyl)(2-methyl-4-3',5'-di-t-butylphenylindenyl)zirconium dichloride;
  dimethylsilylene-(2-isopropyl-4(4-t-butyl)phenyl)indenyl) (2-methyl-4-phenyl indenyl) zirconium dichloride;
  dimethylsilylene-(2-isopropyl-4(4-t-butyl)phenyl)indenyl) (2-methyl-4-phenyl indenyl) hafnium dichloride;
  dimethylsilylene-(2-isopropyl-4(4-t-butyl)phenyl)indenyl) (2-methyl, 4-t-butylindenyl) zirconium dichloride;
  dimethylsilylene-(2-isopropyl-4(4-t-butyl)phenyl)indenyl) (2-methyl, 4-t-butylindenyl) hafnium dichloride;
  dimethylsilylene-(2-isopropyl-4(4-t-butyl)phenyl)indenyl) (2-methyl-4-phenylindacenyl) zirconium dichloride;
  dimethylsilylene-(2-isopropyl-4(4-t-butyl)phenyl)indenyl) (2-methyl-4-phenylindacenyl) hafnium dichloride;
  dimethyl silylene (4-o-biphenyl-2-(1-methylcyclohexyl)methyl-indenyl) (4-(3,5-di-tert-butylphenyl)-2-methyl-indenyl) zirconium dichloride; and
  dimethyl silylene (4-o-Biphenyl-2-(1-methylcyclohexyl)methyl-indenyl) (4-(3,5-di-tert-butylphenyl)-2-methyl-indenyl) hafnium dichloride; where, in alternate embodiments, the dichloride in any of the compounds listed above may be replaced with dialkyl, dialkaryl, diflouride, diiodide, or dibromide, or a combination thereof 33. The method of claim 27, wherein the single-site catalyst precursor comprises one or more of:
  dimethylsilylene-bis(2-cyclopropyl-4-phenylindenyl)zirconium dichloride; dimethylsilylene-bis(2-cyclopropyl-4-phenylindenyl)hafnium dichloride;
  dimethylsilylene-bis(2-methyl-4-phenylindenyl)zirconium dichloride;
  dimethylsilylene-bis(2-methyl-4-phenylindenyl)hafnium dichloride;
  dimethylsilylene-bis(2-methyl-4-orthobiphenylindenyl) hafnium dichloride;
  dimethylsilylene-bis(2-methyl-4-orthobiphenylindenyl) zirconium dichloride;
  dimethylsilylene-(2-cyclopropyl-4-orthobiphenylindenyl)(2-methyl-4-3',5'-di-t-butylphenylindenyl)hafnium dichloride;
  dimethylsilylene-(2-cyclopropyl-4-orthobiphenylindenyl)(2-methyl-4-3',5'-di-t-butylphenylindenyl)zirconium dichloride;

dimethylsilylene-(2-isopropyl-4(4-t-butyl)phenyl)indenyl) (2-methyl-4-phenyl indenyl) zirconium dichloride;
dimethylsilylene-(2-isopropyl-4(4-t-butyl)phenyl)indenyl) (2-methyl-4-phenyl indenyl) hafnium dichloride;
dimethylsilylene-(2-isopropyl-4(4-t-butyl)phenyl)indenyl) (2-methyl, 4-t-butylindenyl) zirconium dichloride;
dimethylsilylene-(2-isopropyl-4(4-t-butyl)phenyl)indenyl) (2-methyl, 4-t-butylindenyl) hafnium dichloride;
dimethylsilylene-(2-isopropyl-4(4-t-butyl)phenyl)indenyl) (2-methyl-4-phenylindacenyl) zirconium dichloride;
dimethylsilylene-(2-isopropyl-4(4-t-butyl)phenyl)indenyl) (2-methyl-4-phenylindacenyl) hafnium dichloride;
dimethyl silylene (4-o-biphenyl-2-(1-methylcyclohexyl) methyl-indenyl) (4-(3,5-di-tert-butylphenyl)-2-methyl-indenyl) zirconium dichloride; and
dimethyl silylene (4-o-Biphenyl-2-(1-methylcyclohexyl) methyl-indenyl) (4-(3,5-di-tert-butylphenyl)-2-methyl-indenyl) hafnium dichloride; where, in alternate embodiments, the dichloride in any of the compounds listed above may be replaced with dialkyl, dialkaryl, diflouride, diiodide, or dibromide, or a combination thereof.

34. The method of claim 12, wherein the T is represented by $R'_2C$, $R'_2Si$, or $R'_2Ge$, where each R' is, independently, hydrogen or a $C_1$ to $C_{20}$ containing hydrocarbyl, substituted hydrocarbyl, halocarbyl, substituted halocarbyl, silylcarbyl or germylcarbyl substituent, and optionally, two or more adjacent R' may join to form a substituted or unsubstituted, saturated, partially unsaturated or aromatic, cyclic or polycyclic substituent.

35. The method of claim 12, wherein the T is $CH_2$, $CH_2CH_2$, $C(CH_3)_2$, $SiMe_2$, $SiPh_2$, $SiMePh$, $(Si(CH_2)_3)$, $(Ph)_2C$, $(p-(Et)_3SiPh)_2C$, $(Si(CH_2)_4)$, or $Si(CH_2)_5$.

* * * * *